(12) United States Patent    (10) Patent No.: US 8,556,416 B2
Lawu                         (45) Date of Patent:     Oct. 15, 2013

(54) DIFFRACTIVE MULTIFOCAL LENS

(75) Inventor: Tjundewo Lawu, Toda (JP)

(73) Assignee: Hoya Corporation, Tokyo (JP)

( * ) Notice: Subject to any disclaimer, the term of this patent is extended or adjusted under 35 U.S.C. 154(b) by 312 days.

(21) Appl. No.: 13/132,914

(22) PCT Filed: Dec. 2, 2009

(86) PCT No.: PCT/JP2009/070213
§ 371 (c)(1),
(2), (4) Date: Jun. 13, 2011

(87) PCT Pub. No.: WO2010/064640
PCT Pub. Date: Jun. 10, 2010

(65) Prior Publication Data
US 2011/0234974 A1    Sep. 29, 2011

(30) Foreign Application Priority Data
Dec. 5, 2008 (JP) .................. 2008-311521

(51) Int. Cl.
G02C 7/04   (2006.01)
G02C 7/06   (2006.01)
G02B 27/44  (2006.01)
G02B 5/18   (2006.01)
A61F 2/16   (2006.01)

(52) U.S. Cl.
USPC .............. 351/159.15; 351/159.44; 359/565; 359/571; 623/6.3; 623/6.31

(58) Field of Classification Search
USPC .............. 351/159.15, 159.44; 359/565, 571; 623/6.3, 6.31
See application file for complete search history.

(56) References Cited

U.S. PATENT DOCUMENTS

| 4,995,715 A | 2/1991 | Cohen |
| 5,017,000 A | 5/1991 | Cohen |
| 5,760,871 A | 6/1998 | Kosoburd et al. |
| 2004/0252274 A1 | 12/2004 | Morris et al. |
| 2006/0244905 A1* | 11/2006 | Piers et al. ............... 351/161 |
| 2009/0187242 A1* | 7/2009 | Weeber et al. ............ 623/6.24 |

FOREIGN PATENT DOCUMENTS

| JP | 7-198909 A | 8/1995 |
| JP | 2006-527867 A1 | 12/2006 |
| WO | WO 01/04667 A1 | 1/2001 |
| WO | WO-2006/023404 A2 | 3/2006 |
| WO | WO-2007/092949 A1 | 8/2007 |

OTHER PUBLICATIONS

EPO Extended Search Report dated Jan. 31, 2013 for corresponding EP App. Ser. No. 09830406.6.

(Continued)

*Primary Examiner* — Scott J Sugarman
(74) *Attorney, Agent, or Firm* — Henricks, Slavin & Holmes LLP

(57) ABSTRACT

There is provided a diffractive multifocal lens, wherein a diffraction phase structure of a diffraction pattern has a structure expressed by the following formula:

$$\phi(\xi) = \begin{cases} p_1\xi, & 0 \le \xi < w \\ p_2(\xi - 0.5) - q\pi, & w \le \xi < 1-w \\ p_1(\xi - 1), & 1-w \le \xi \le 1 \end{cases} \quad (1)$$

wherein $\xi$ indicates a position in a radial direction of the lens in one period of the diffraction pattern, and $\phi(\xi)$ indicates a value (radian) of a phase shift amount of light passing through the position of $\xi$ from the phase of light passing through a reference plane.

8 Claims, 20 Drawing Sheets

Bifocal diffraction structure

(56) References Cited

OTHER PUBLICATIONS

Kallioniemi I et al: "Optimization of continuous-profile blazed gratings using rigorous diffraction theory". Optics Communications. North-Holland Publishing Co. Amsterdam. NL. vol. 177. No. 1-6. Apr. 1, 2000. pp. 15-24.

PCT International Search Report dated Jan. 19, 2010 for PCT App. U.S. Appl. No. PCT/JP2009/070213.

* cited by examiner

Prototype 2-2    Pupil diameter Φ = 3.0mm

Distance vision          Near vision

Prototype 3-2    Pupil diameter Φ = 3.0mm

Distance vision    Intermediate vision    Near vision

Defocusing characteristics of prototype 3-2

Gaussian diffraction structure

Case of pupil diameter Φ = 3.0mm

| Comparative example A | Comparative example B | Example 4 |
|---|---|---|
|  |  |  |
|  |  | |
| Enlarged view of halo | Enlarged view of halo | Enlarged view of halo |

Case of pupil diameter Φ = 4.5mm

| Comparative example A | Comparative example B | Example 4 |
|---|---|---|
|  |  |  |
|  | | |
| Enlarged view of halo | Enlarged view of halo | Enlarged view of halo |

US 8,556,416 B2

DIFFRACTIVE MULTIFOCAL LENS

TECHNICAL FIELD

The present invention relates to a diffractive multifocal lens, and particularly relates to the diffractive multifocal lens capable of optimizing a diffraction efficiency of each diffraction order by using a new phase structure.

DESCRIPTION OF RELATED ART

A diffractive multifocal lens having a plurality of focuses is used as a general optical element, and also is used in various fields of ophthalmic distance vision and near vision corrective ocular lenses (such as spectacles, contact lens, and implantable lens such as intraocular lens), etc.

As an optical structure of the diffractive multifocal lens, a saw-toothed blazed groove type structure, and a rectangular-type binary diffraction structure, being typical diffraction structures, are known. Such a diffractive multifocal lens is light in weight, compared with a refractive multifocal lens, and has a merit that its thickness can be made thin. However, it has also a demerit that glare, etc., is generated due to high wavelength dependency, thus inducing high dispersibility.

In order to control efficiency of its focus, various methods are taken for such a diffractive multifocal lens. For example, patent documents 1 and 2 disclose a technique of obtaining diffraction efficiency in a desired order by changing a depth of a facet (step) in a phase zone plate and a profile (shape) of a periodic function of its diffraction structure.

Further, patent document 3 discloses a technique of controlling efficiency of each order in a phase structure by the periodic function, being a function of a geographical optical height of a rectangular or triangular diffraction surface, and using an error optimizing function such as super-Gaussian function so that the efficiency in each order is close to a previously set target value. Further, patent document 4 discloses a technique of achieving optimization by a multiorder diffractive structure (MOD) and an anterior splitting diffractive structure (WSD).

Patent document 1:
Japanese Patent Laid Open Publication No. 1990-055314
Patent document 2:
U.S. Pat. No. 5,017,000
Patent document 3:
Japanese Patent Laid Open Publication No. 1995-198909
Patent document 4:
Japanese Patent Laid Open Publication No. 2008-511019

DISCLOSURE OF THE INVENTION

Problem to be Solved by the Invention

However, in a conventional diffractive multifocal lens with the aforementioned structure, it is difficult to change its phase structure, and is difficult to efficiently distribute the efficiency in each order to desired values, and define its phase structure. Further, a designed phase structure has an extremely detailed structure in some cases, wherein an additional step is provided as is disclosed in patent document 4, and machining of such a lens is also extremely difficult.

Further, when the phase structure is optimized for actually machining a lens, desired efficiency is sometimes not obtained depending on the error optimizing function, due to a problem of fluctuation and vibration caused by error. In such a case, complicated function or extremely lots of variables are required. For example, when the posterior nine harmonic terms in harmonic function, being Fourier series of patent document 4, eighteen variables need to be optimized. Further, in a case of an asymmetric super-Gaussian distribution of efficiencies of patent document 3, five variables of H, $W_1$, $m_1$, $W_2$, $m_2$ need to be optimized, thus complicating the computation of an optimizing process.

Further, in order to obtain trifocal lens having −1 order, 0-order, and +1-order in the multifocal lens, inventors of the present invention study on a mixture type multifocal lens wherein a diffractive type structure and a refractive type structure combined. Also, the inventors of the present invention study on a trifocal lens by adding a harmonic diffraction order to the diffractive multifocal lens which has a diffraction structure of a blaze structure and a binary structure having a phase shift, and a blaze structure of 0-order and +1-order. However, similarly to the techniques of patent documents 3 and 4, control and optimization are complicated, thus requiring a complicated work due to lots of variables.

In view of the above-described circumstance, the present invention is provided, and an object of the present invention is to provide a diffractive multifocal lens capable of distributing desired high efficiencies in each order, being each focus, and capable of simply and easily optimizing its diffraction phase structure.

Means for Solving the Problem

In order to solve the above-described problem, according to a first means of the present invention, there is provided a diffractive multifocal lens, having an annular diffraction pattern for exhibiting a light diffraction effect, which is formed concentrically repeatedly on a surface of a lens, wherein a diffraction phase structure of the diffraction pattern has a structure expressed by the following formula:

[Formula 1]

$$\phi(\xi) = \begin{cases} p_1 \xi, & 0 \leq \xi < w \\ p_2(\xi - 0.5) - q\pi, & w \leq \xi < 1-w \\ p_1(\xi - 1), & 1-w \leq \xi \leq 1 \end{cases} \quad (1)$$

wherein each symbol is as follows:
$\xi$ indicates a position in a radial direction of the lens in one period of the diffraction pattern, having values from 0 to 1;
w indicates a position where a form of the formula of $\phi(\xi)$ is changed;
$\phi(\xi)$ indicates a value (radian) of a phase shift amount of light passing through the position of $\xi$ from the phase of light passing through a reference plane;
$p_1$ indicates a value defining a gradient of a straight line $\phi(\xi)$, when satisfying $0 \leq \xi < w$, and $1-w \leq \xi \leq 1$;
$p_2$ indicates a value defining the gradient of the straight line $\phi(\xi)$ when satisfying $w \leq \xi < 1-w$; and
q indicates a parallel moving amount over the reference plane of the straight line $\phi(\xi)$ when satisfying $w \leq \xi < 1-w$.

According to a second means of the present invention, there is provided the diffractive multifocal lens of the first means, wherein the q satisfies $0 < |q| \leq 1$.

According to a third means of the present invention, there is provided a diffractive multifocal lens having an annular diffraction pattern for exhibiting a light diffraction effect, which is formed concentrically repeatedly on a surface of a lens, wherein a diffraction phase structure of the diffraction pattern has a structure expressed by a curve which is obtained by smoothing and optimizing a curve showing a diffraction phase structure of the first means or the second means, using curve approximation, filtering, or convolution integration.

According to a fourth means, there is provided the diffractive multifocal lens of any one of the first to third means, wherein the diffractive multifocal lens is an ocular lens such as a contact lens and an intraocular lens.

Advantage of the Invention

The first means has an advantage that efficiency of each order can be controlled by varying sizes of inclinations $p_1$, $p_2$, q, and w of formula (1) which defines a diffraction phase structure.

Further, according to the second means, the focus can be set to three focuses of −1-order, 0-order, and +1-order, by setting height or depth q of the aforementioned formula (1) in a range of $0<|q|\leq 1$, and therefore lost efficiency can be integrated to a phase portion of zero. Therefore, total efficiency is higher than the efficiency of two focuses.

According to the third means, owing to the smoothing, a designed ideal shape which is difficult to be machined, can be converted to a shape close to a real shape which is easy to be machined. Therefore, machinability during machining a lens can be improved.

According to the fourth means, the ocular lens such as contact lens and intraocular lens having the characteristic of the diffractive multifocal lens of the first to third means can be obtained.

The present invention will be more specifically described hereafter.

As described above, according the present invention, there is provided the diffraction phase structure and the diffractive multifocal lens having the diffraction phase structure, capable of controlling the diffraction efficiency of each diffraction order, by changing the phase structure by defining $\phi(\xi)$ of the following formula 1, which indicates the diffractive phase structure, with parameters such as q and $p_1$, $p_2$, and w.

Note that q indicates a parallel moving amount over the reference plane of the straight line $\phi(\xi)$ and is called "height or depth" for convenience of simplifying the description hereafter.

Further, $p_1$, $p_2$ indicate the gradient of the straight line $\phi(\xi)$ and are called "inclinations" for the convenience of simplifying the description hereafter.

[Formula 1]

$$\phi(\xi) = \begin{cases} p_1 \xi, & 0 \leq \xi < w \\ p_2(\xi - 0.5) - q\pi, & w \leq \xi < 1-w \\ p_1(\xi - 1), & 1-w \leq \xi \leq 1 \end{cases} \quad (1)$$

$p_1$, $p_2$, q, and w, are values as follows:
$p_1$ indicates an inclination of $-0 \leq \xi < w$, and $1-w \leq \xi \leq 1$ of formula (1) of the diffraction phase structure;
$p_2$ indicates an inclination of $w \leq \xi < -1-w$;
q indicates a depth, and
w indicates a position where the form of the formula $\phi(\xi)$ is changed.

Further, when the height or depth q of the formula (1) is small, the diffraction structure having three orders: −1-order, 0-order, and +1-order can be obtained, and when the height or depth q is in a range of $0<|q|\leq 1$, the diffraction structure having three orders: −1-order, 0-order, and +1-order can be obtained. Thus, the lost efficiency can be integrated to the phase portion of 0-order, and therefore total efficiency is higher than the efficiency of two focuses.

Smoothing is carried out for the reason as follows. Namely, the diffraction phase structure is a saw toothed blazed groove type or a rectangular binary type diffraction structure, being typical diffraction structures of a designed ideal phase conversion plane, and has a sharp edge shape. Therefore, its shape is difficult to be machined. Accordingly, the designed ideal shape needs to be converted to a shape close to a real shape. Further, smoothing needs to be carried out, for increasing the machinability during machining of the lens.

For example, smoothing includes smoothing by curve approximation using sinusoidal function, cosine function, spline function, and polynomial expression, etc., smoothing by filtering using low-pass filter such as butterfly filter, Butterworth filter, and Kalman filter, and smoothing by convolution integration using super-Gaussian function. As a distribution or function for carrying out the convolution integration, an optimal distribution or function capable of obtaining a desired waveform can be used. However, in the present invention, Gaussian function capable of obtaining the desired waveform with fewer variables, is preferably used.

A case of using the Gaussian function will be described hereafter, by using an example of having a relation expressed by formula (2) wherein a phase of the Gaussian diffraction optical structure is expressed by $\phi_G(\xi)$.

[Formula 2]

$$\phi_G(\xi) = \phi(\xi) * g(\xi) \quad (2)$$

$\phi_G(\xi)$ of formula (2) indicates the Gaussian diffraction optical structure, and $\phi(\xi)$ indicates a diffraction optical structure which belongs to a binary phase diffraction optical element before smoothing. $g(\xi)$ indicates the Gaussian function having standard deviation $\sigma$, $\xi$ indicates a dividing position between 0 and 1 in a diffraction zone, and * indicates a convolution integration. $g(\xi)$ in the formula (2) is expressed by the following formula (3).

[Formula 3]

$$g(\xi) = \frac{1}{\sigma\sqrt{2\pi}} \exp\left(-\frac{\xi^2}{2\sigma^2}\right) \quad (3)$$

Further, a diffraction pattern $Z_G(\xi)$ of the height or depth from the reference plane of a planar surface including a vertex of a peak portion or a bottom side of a valley portion of a ruggedness shape after Gaussian smoothing, can be simply expressed by the following formula (4).

[Formula 4]

$$z_G(\xi) = \frac{\lambda}{2\pi(n_s - n_o)} \phi_G(\xi) \quad (4)$$

Wherein, $n_s$ and $n_o$ indicate refractive indexes of a lens material and a medium respectively, and $\lambda$ indicates a designed wavelength.

Wherein, transmission function $t_A(\xi)$ of the Gaussian diffraction structure can be calculated by a complex amplitude of an optical wave propagation described in document J. W. Goodman, "Introduction to Fourier Optics, "McGraw-Hill, Int'l. Ed, Singapore(1996), and is expressed by the following formula (5).

[Formula 5]

$$t_A(\xi) = A(\xi)\exp\{j\phi_G(\xi)\} = A(\xi)\exp\left\{j\frac{2\pi(n_s - n_o)}{\lambda}z_G(\xi)\right\} \quad (5)$$

In formula (5), $A(\xi)$ indicates an amplitude of light, which is uniform in a zone, and j is an imaginary number unit ($j^2=-1$) in this function. The transmission function $t_A(\xi)$ of formula (5) can be expressed by a complex Fourier series of the following formula (6), by using the periodicity of $Z_G(\xi)$ of formula (4).

[Formula 6]

$$t_A(\xi) = \sum_{m=-\infty}^{\infty} a_m \exp(j2\pi m\xi) \quad (6)$$

Thus, coefficient $a_m$ of the Fourier series is calculated by the following formula (7).

[Formula 7]

$$a_m = \int_0^1 t_A(\xi)\exp(-j2\pi m\xi)d\xi \quad (7)$$

From the above formula (7), diffraction efficiency $\eta_m$ in m-order of the Gaussian diffraction optical structure is obtained by the following formula.

[Formula 8]

$$\eta_m = |a_m|^2 \quad (8)$$

Accordingly, the Gaussian diffraction optical structure is designed by selecting a numerical value of standard deviation $\sigma$ of the Gaussian function and a suitable parameter of $\phi(\xi)$.

Generally, optimized designing of the Gaussian diffraction optical structure is mathematically carried out by a specific mathematical optimization method described in document J. C. Lagarias, J. A. Reeds, M. H. Wright, and P. E. Wright, "Convergence Properties of the Nelder-Mead Simlex Method in Low Dimensions, "SIAM Journal of Optimization, 9(1), pp. 112-147 (1998). In order to realize mathematical optimization, a suitable merit function based on desired diffraction efficiency is used. Various merit functions can be defined, and according to an example shown in an optical design program ZEMAX (registered trademark) produced by ZEMAX Development Corporation US, the following formula is used for the optimization.

[Formula 9]

$$MF = \sqrt{\frac{\sum_m W_m(\eta_m - \eta_{Tm})^2}{\sum_m W_m}} \quad (9)$$

Wherein, $\eta_m$ indicates the diffraction efficiency at the present point, $\eta_{Tm}$ indicates the diffraction efficiency of a target value in m-order, and $W_m$ indicates weighting of the diffraction efficiency in m-order wherein $W_m$ is weighted by setting it to be larger than other order so that the efficiency of a preferential order is closer to target efficiency. Total efficiency is obtained by normalizing all m-orders by the target efficiency. The specific optimization method is carried out by minimizing the value of MF by selecting optimal values of $p_1$, $p_2$, q, w, $\sigma$, and $\sigma$.

Explanation has been given for a case that smoothing is carried out by the convolution integration using the Gaussian function. However, a desired diffraction optical structure can also be obtained by direct Fourier transform without performing a smoothing process. However, five variables of $p_1$, $p_2$, q, w, $\sigma$ can be selected by using the Gaussian function, and therefore it is found that the degree of freedom in design can be increased, and the calculation for optimization can be extremely simplified, and therefore smoothing suitable for machining such as lathe machining and cast molding machining can be easily executed.

Further, calculation efficiency can also be increased, by fixing several parameters (constants) to reduce the number of parameters, out of parameters $p_1$, $p_2$, q, w, $\sigma$, while maintaining the target efficiency in each order.

Further, a sharp edge of $\phi(\xi)$ disappears by such a smoothing process, and therefore reduction of glare owing to the reduction of light scattering caused by the edge can be expected, and improvement of contrast sensitivity can also be expected. Further, when the multifocal lens is a contact lens, it is possible to expect effects that light scattering caused by the edge is reduced, then the glare is reduced, and contrast sensitivity can be improved, and when the multifocal lens is a contact lens, the following effects can be expected. Namely, deterioration in wearing sensation due to edge can be prevented and deposition of a lipid component, etc., of lacrimal fluid on a diffraction part can be prevented.

Here, $\phi(\xi)$ showing a simplest diffraction phase structure for completely equivalently dividing the efficiencies of −1-order diffraction and +1-order diffraction, can be expressed by the following formula.

[Formula 10]

$$\phi(\xi) = \begin{cases} 0, & 0 \leq \xi < 0.25 \\ -\pi, & 0.25 \leq \xi < 0.75 \\ 0, & 0.75 \leq \xi \leq 1 \end{cases} \quad (10)$$

Table 1 shows the efficiency by various standard deviations $\sigma$ obtained by formula (10) and formulas (1) to (9), when designed wavelength is expressed by $\lambda=546.074$ nm and refractive index is $n_s=1.5$, and FIG. 1 shows a graph indicating depth $Z_G(\xi)$ of the Gaussian diffraction structure.

TABLE 1

| Standard deviation σ and, −1 and +1-order efficiency ($\eta_{-1} = \eta_{+1}$) | |
|---|---|
| σ | $\eta_{-1} = \eta_{+1}$ |
| 0.00 | 0.405 |
| 0.02 | 0.403 |
| 0.04 | 0.395 |
| 0.06 | 0.382 |
| 0.08 | 0.365 |

The rectangular waveform is smoothed, with an increase of the value of the standard deviation σ, thus providing a smooth curve suitable for machining. However, there is a tendency that the efficiency ($\eta_{-1}=\eta_{+1}$) is reduced. However, it is found that extremely high efficiency ($\eta_{-1}=\eta_{+1} \geq 0.382$) can be realized by the Gaussian diffraction structure, being the aforementioned diffraction phase structure, even in a case of σ=0.06.

BEST MODE FOR CARRYING OUT THE INVENTION

FIG. 2 is a sectional view of a diffractive multifocal lens according to an embodiment of the present invention; FIG. 3 is a view showing a ruggedness surface shape of a diffraction pattern formed on the diffractive multifocal lens shown in FIG. 2; and FIG. 4 is a view showing a specific shape dimension of a diffractive pattern 11 shown in FIG. 3.

The diffractive multifocal lens 10 shown in FIG. 2 is formed by combining a refractive lens structure and a diffractive structure, wherein the diffractive structure is formed on an object side face 11, and an image side face 12 is formed in an ordinary refractive surface, which is a so-called bifocal (two focuses) lens formed so that parallel lights L0 incident from the object side face 11 are brought to focus at two points, f1(+1-order) and f2(−1 order) on an optical axis O.

In FIG. 3, in the diffractive structure, a diffractive surface is formed on the object side face, and the image side face is formed on a planar surface. Then, the parallel lights L0 incident from the object side are distributed to two orders of −1-order and +1-order. The bifocal lens shown in FIG. 2 is formed by combining the diffractive structure and the refractive lens structure. Here, the diffraction pattern of the refractive surface 11 is formed in an annular ruggedness shape which is provided repeatedly in a radial direction, with its period being smaller toward an outer peripheral side, wherein lights are divided into two or more diffraction orders, so that a plurality of focal lengths are obtained.

FIG. 4 shows a specific shape dimension of the diffraction pattern 11, wherein a horizontal axis of the figure indicates a distance toward the outer peripheral side of the lens in the radial direction with optical axis O set as 0, being a distance from a center of the lens. Further, a vertical axis of the figure indicates a depth (called surface sag hereafter) engraved to an image side from a reference plane, with a planar surface including the top of a peak portion of the ruggedness shape as the reference plane, namely, a distance in a thickness direction of the lens. Further, regarding a unit pattern composed of one set of ruggedness shape in the diffraction pattern 11, FIG. 5 and FIG. 6 show diffraction phase structure indicating a phase relation of lights passing through this portion. Here, FIG. 5 shows a diffraction phase structure without smoothing, and FIG. 6 shows a diffraction phase structure with smoothing by using the Gaussian function.

When the phase patterns of FIG. 5 and FIG. 6 are examined in a case of q<0, the phase structure is formed in an upper direction of a phase (radian) of the vertical axis, and is formed in a lower direction thereof in a case of q>0. However, each case has the same result of the efficiency, etc. Further, the following examples 1 and 2 were examined in a case of q>0.

The diffraction pattern of FIG. 6 is calculated by $Z_G$ of formula (4), and the Gaussian diffraction optical structure $\phi_G(\xi)$ which has undergone smoothing process can be determined by determining a target efficiency $\eta_{Tm}$, weight $W_m$ of the diffraction efficiency of each order and standard deviation $\sigma$ of the Gaussian function, and selecting each parameter, $p_1$, $p_2$, $q$, $w$ which are obtained by optimization using formula (9). The diffraction phase structure without smoothing can be determined by selecting each parameter $p_1$, $p_2$, $q$, $w$ by optimizing only the diffraction phase structure $\phi(\xi)$ of formula (1). However, the diffraction phase structure of FIG. 5 without smoothing is formed by removing a smoothing effect, which is obtained by using the Gaussian function $g(\xi)$ of formula (3), by setting the standard deviation $\sigma$ a of the Gaussian function to $\sigma=0$.

Further, smoothing can also be applied to the optimized diffraction phase pattern of FIG. 5 by using the Gaussian function, etc. However, the smoothing is not carried out here. This is because the diffraction phase structure is optimized to obtain efficiency closest to target efficiency, and the phase structure obtained by using each selected parameter $p_1$, $p_2$, $q$, $w$ is different from the optimized phase structure by smoothing, and the efficiency closest to the target efficiency can not be obtained. When smoothing is carried out, optimization is preferably achieved by minimizing the value of MF of formula (9), with formula (2) as a basic formula. By the formula (2), the Gaussian diffraction optical structure $\phi_G(\xi)$ is obtained by convolution integration of the diffraction phase structure $\phi(\xi)$ of formula (1) and the Gaussian function $g(\xi)$ of formula (3).

AN EXAMPLE OF BIFOCAL LENS

The diffractive multifocal lens according to example 1 is a bifocal lens with distance vision power of +20.0D, and an addition power of +3.0D. The diffractive multifocal lens is formed by combining the refractive lens structure with refraction power of +21.5D, and the diffractive lens structure as described below. Namely, the diffractive multifocal lens of example 1 has the diffractive lens structure wherein −1-order refraction power is −1.5D, and +1-order refraction power is +1.5D, and −1-order and +1-order have the same diffraction effect. PMMA is used as a material, and refractive index $n_s$ is $n_s=1.493$ when a designed wavelength is 546.074 nm. Further, refractive index $n_o$ of aqueous humor, being a medium, is $n_o=1.336$, and a anterior surface is formed in a spherical surface with radius curvature of 7.30 mm having a diffraction structure on the anterior surface, and a posterior surface is formed in a planar surface. Further, lens diameter is 6.0 mm, lens edge thickness is 1.0 mm, and center thickness is 1.64 mm, thus forming a lens having a plano-convex structure. The diffraction phase structure can be expressed by formula (11) wherein $p_1$, $p_2=p$, $q$, $w=0.25$.

[Formula 11]

$$\phi(\xi) = \begin{cases} p\xi, & 0 \leq \xi < 0.25 \\ p(\xi - 0.5) - q\pi, & 0.25 \leq \xi < 0.75 \\ p(\xi - 1), & 0.75 \leq \xi \leq 1 \end{cases} \quad (11)$$

The aforementioned diffraction structure was designed and evaluated as follows. Namely, formula (11) was used instead of formula (1) as the formula expressing the diffraction phase structure, then optimization was achieved by formula (9), and a design was determined by selecting two parameters $p$, $q$, to thereby evaluate an optical performance. In this case, weight $W_m$ for optimization was $W_{-1}=W_0=W_{+1}=1$, the standard deviation $\sigma$ of the Gaussian function was $\sigma=0.05$, target efficiency at the time of $\sigma=0$ without smoothing using the Gaussian function was $\eta_{T-1}=0.500$, $\eta_{T0}=0.000$, and $\eta_{T+1}=0.500$. Results thereof are shown in table 2-1 and table 2-2.

TABLE 2-1

| Parameter | Without smoothing | Gaussian smoothing |
|---|---|---|
| p = p₁ = p₂ | 0.00000000 | −0.00000001 |
| q | 1.00000000 | 1.05132605 |
| w (fixed) | 0.25 | 0.25 |
| σ (fixed) | 0 | 0.05 |

TABLE 2-1-continued

| Parameter | | Without smoothing | Gaussian smoothing |
|---|---|---|---|
| Actual optimized efficiency $\eta_m$ (Target efficiency $\eta_{Tm}$) | $\eta_{-1}$ (0.500) | 0.405 | 0.389 |
| | $\eta_0$ (0.000) | 0 | 0.021 |
| | $\eta_{+1}$ (0.500) | 0.405 | 0.389 |
| Total | (1.000) | 0.810 | 0.799 (0.778; excluding 0-order) |

In a case of the Gaussian smoothing, although the efficiency is generated in 0-order, it is considered to be a very small value which is hardly observed even when an image is formed on this point as a focus. It is found from the above-described result, that the efficiency is higher in a case without smoothing than in a case with smoothing, but a difference in total efficiency between −1-order and +1-order is small like 0.032, which is generated by presence/absence of the Gaussian smoothing, and only a small reduction of the efficiency occurs by the Gaussian smoothing.

Further, when actual value $\eta_m$ of each order is converted at such a rate that a total value of each order is 1 in the actual efficiency $\eta_m$ of the diffraction structure in a case without smoothing and in a case with Gaussian smoothing, the efficiency of each order is as shown in the table 2-2.

TABLE 2-2

| | Actual optimized efficiency $\eta_m$ (Target efficiency $\eta_{Tm}$) | Without smoothing Conversion efficiency (actual efficiency $\eta_m$) | Gaussian smoothing Conversion efficiency (actual efficiency $\eta_m$) |
|---|---|---|---|
| | $\eta_{-1}$ (0.500) | 0.500 (0.405) | 0.487 (0.389) |
| | $\eta_0$ (0.000) | 0.000 (0.000) | 0.026 (0.021) |
| | $\eta_{+1}$ (0.500) | 0.500 (0.405) | 0.487 (0.389) |
| Total | (1.000) | 1 (0.810) | 1 (0.799) |

It was found from the above-described result, that the total of the actual efficiencies was a lower value than the total of the target efficiencies in either of the case without smoothing and the case with Gaussian smoothing. However, it was found that the actual efficiencies of −1-order and +1-order were equal values when the rate of the total actual efficiencies was taken into consideration in the case without smoothing and in the case with Gaussian smoothing, and results as designed could be obtained.

Further, the bifocal addition power is half of the power of a general diffraction structure, which is obtained by dividing the diffraction power into −1-order and +1-order, and an effect of reducing a chromatic aberration can be expected.

Next, in order to examine a rotationally symmetric lens as a bifocal lens having −1-order power −P(D) and +1-order power +P(D) as the addition power, phase relation $\psi(r)$ of the rotationally symmetric lens with power P can be analytically expressed by the following formula (12).

[Formula 12]

$$\psi(r) = \frac{2\pi}{\lambda}\left(\sqrt{r^2 + f^2} - f\right) \quad (12)$$

Wherein, f=1/P is a focal distance of the lens, and r is a radial distance from a center of the lens.

Further, when the focal distance is extremely larger than the radial distance (r/f<<1), the phase function $\psi(r)$ can be approximately expressed by the following formula (13).

[Formula 13]

$$\psi(r) \approx \frac{\pi}{\lambda}\frac{r^2}{f} \quad (13)$$

Based on the phase function $\psi(r)$, a surface ruggedness shape (surface sag) of the Gaussian diffraction structure can be obtained by forming a reference surface of each period at each multiplication of $2\pi$ phase difference which is one period, and replacing the reference surface of each period by diffraction pattern $Z_G(\xi)$ of formula (4).

Wherein, in a case of the bifocal lens with P=1.5(D), f=666.7 mm, and addition power of 3.0(D), the ruggedness surface shape (Surface sag) of the Gaussian diffraction structure was obtained as follows. Namely, the ruggedness surface shape was calculated by using the modified fminsearch function (published by a website of The Math Works Inc.) in consideration of a boundary condition of the programming software MATLAB produced by The Math Works Inc. US, as a plot of the Gaussian diffraction structure $Z_G(\xi)$. FIG. 7 shows each diffraction phase structure of a case without smoothing in one period thus obtained (broken line), and a case with Gaussian smoothing (solid line). Further, FIG. 4 shows a specific ruggedness shape and a dimension (surface sag) of the Gaussian diffraction structure.

EXAMPLE 2-1

Similarly to the example 1, example 2-1 is an example of forming the diffractive multifocal lens as the bifocal lens with distance vision power of +20.0D, and addition power of +3.0D by using the present invention.

A different point from the example 1 is as follows. First, two-order Gaussian diffraction structure of −1-order and +1-order having different diffraction effects, was used as the diffractive lens structure, by using formula (1). The refractive lens structure is formed as a convex lens structure with refractive power of +21.5D. Design of the diffraction structure was determined and trial design thereof was made, with target efficiency $\eta_{Tm}:\eta_{T-1}=0.550$, $\eta_{T0}=0.000$, $\eta_{T+1}=0.450$, under conditions of weight $W_m$ for optimization: $W_{-1}=W_0=W_{+1}=1$, standard deviation of the Gaussian function: $\sigma=0.05$, and $\sigma=0$ without smoothing using the Gaussian function, and four parameters selected as $p_1$, $p_2$, q, w, to thereby evaluate a designed optical performance. Results thereof are shown in table 3-1-1 and table 3-1-2, and FIG. 8 shows the diffraction phase structure of the case without smoothing (broken line) in one period, and the case with Gaussian smoothing (solid line) in one period, and FIG. 9 shows the specific ruggedness surface shape and the dimension (surface sag) of the Gaussian diffraction structure.

TABLE 3-1-1

| Parameter | Without smoothing | Gaussian smoothing |
|---|---|---|
| $p_1$ | 0.05000000 | 0.10000000 |
| $p_2$ | 0.07673711 | 0.10000000 |
| q | 1.00000000 | 1.05150560 |
| w | 0.24364786 | 0.24803284 |
| $\sigma$ (fixed) | 0 | 0.05 |

TABLE 3-1-1-continued

| Parameter | | Without smoothing | Gaussian smoothing |
|---|---|---|---|
| Actual optimized efficiency $\eta_m$ (Target efficiency $\eta_{Tm}$) | $\eta_{-1}$ (0.550) | 0.458 | 0.435 |
| | $\eta_0$ (0.000) | 0.000 | 0.021 |
| | $\eta_{+1}$ (0.450) | 0.354 | 0.344 |
| Total | (1.000) | 0.812 | 0.800 (0.779; excluding 0-order) |

The result was that the efficiency of each order without smoothing was higher than the efficiency of each order with Gaussian smoothing. However, the difference in total of −1-order and +1-order efficiencies was 0.033 and small, and it is found that only a small reduction of the efficiency by Gaussian smoothing occurs.

Further, when the actual value $\eta_m$ of each order is converted at such a rate that a value obtained by totaling the values of each order is 1 in the actual efficiency $\eta_m$ of the diffraction structure in the case without smoothing and in the case with Gaussian smoothing, the efficiency of each order is as shown in table 3-1-2.

TABLE 3-1-2

| Actual optimized efficiency $\eta_m$ (Target efficiency $\eta_{Tm}$) | Without smoothing Conversion efficiency (actual efficiency $\eta_m$) | Gaussian smoothing Conversion efficiency (actual efficiency $\eta_m$) |
|---|---|---|
| $\eta_{-1}$ (0.550) | 0.564 (0.458) | 0.544 (0.435) |
| $\eta_0$ (0.000) | 0.000 (0.000) | 0.026 (0.021) |
| $\eta_{+1}$ (0.450) | 0.436 (0.354) | 0.430 (0.344) |
| Total (1.000) | 1 (0.812) | 1 (0.800) |

It was found from the above-described results, that +1-order efficiency was slightly lower than the target efficiency in either of the case without smoothing and in the case with Gaussian smoothing. However, when the rate of the total of the actual efficiencies in the case without smoothing and in the case with Gaussian smoothing was taken into consideration, it was found that −1-order and +1-order actual efficiencies were close to a target value, thus making it possible to control the efficiency of each order. Also, it was found that there was a variation in the efficiencies of each order by inclinations of $p_1$ and $p_2$ in FIG. 8 and FIG. 9, compared with FIG. 7 and FIG. 4 of the example 1.

EXAMPLE 2-2

Similarly to the example 1 and the example 2-1, example 2-2 is an example of forming the diffractive multifocal lens by using the present invention, as the bifocal lens with distance vision power of +20.0D and addition power of +3.0D, which is the bifocal lens of the combination of a two-order Gaussian diffraction structure of −1-order and +1-order having different diffraction effects, and the refractive lens structure with refractive power of +21.5D. Trial design was made by selecting two parameters of p and q by using formula (11) for expressing the diffraction structure, with target efficiency $\eta_{Tm}$ expressed by $\eta_{T-1}$=0.550, $\eta_{T0}$=0.000, and $\eta_{T+1}$=0.450 under conditions similar to the conditions of the example 2-1, to thereby evaluate the designed optical performance. Results thereof are shown in table 3-2-1 and table 3-2-2, and FIG. 10 shows the diffraction phase structure in the case without smoothing (broken line) in one period and in the case with Gaussian smoothing (solid line) in one period, and FIG. 11 shows the specific ruggedness surface shape and the dimension (surface sag) of the Gaussian diffraction structure.

TABLE 3-2-1

| Parameter | | Without smoothing | Gaussian smoothing |
|---|---|---|---|
| p = p₁ = p₂ | | 0.06737270 | 0.11120391 |
| q | | 1.00212270 | 1.05145301 |
| w (fixed) | | 0.25 | 0.25 |
| σ (fixed) | | 0 | 0.05 |
| Actual optimized efficiency $\eta_m$ (Target efficiency $\eta_{Tm}$) | $\eta_{-1}$ (0.550) | 0.461 | 0.440 |
| | $\eta_0$ (0.000) | 0.000 | 0.021 |
| | $\eta_{+1}$ (0.450) | 0.352 | 0.339 |
| Total | (1.000) | 0.813 | 0.800 (0.779; excluding 0-order) |

TABLE 3-2-2

| Actual optimized efficiency $\eta_m$ (Target efficiency $\eta_{Tm}$) | Without smoothing Conversion efficiency (actual efficiency $\eta_m$) | Gaussian smoothing Conversion efficiency (actual efficiency $\eta_m$) |
|---|---|---|
| $\eta_{-1}$ (0.550) | 0.567 (0.461) | 0.550 (0.440) |
| $\eta_0$ (0.000) | 0.000 (0.000) | 0.026 (0.021) |
| $\eta_{+1}$ (0.450) | 0.433 (0.352) | 0.424 (0.339) |
| Total (1.000) | 1 (0.813) | 1 (0.800) |

It was found from the table 3-2-1, table 3-2-2, FIG. 10, and FIG. 11, that in the example 2-2 as well, similarly to the example 2-1, only a slight reduction of the efficiency by Gaussian smoothing occurred, and +1-order efficiency was slightly lower than the target efficiency in either of the case without smoothing and in the case with Gaussian smoothing. However, −1-order and +1-order actual efficiencies were close to the target value, and it was found that the efficiency of each order could be controlled.

Further, there are four selectable parameters of example 2-1, and two selectable parameters of example 2-2. However, approximately the same efficiency can be obtained in either of the case with Gaussian smoothing and the case without smoothing, and it is found that by carrying out optimization so as to be close to the target efficiency, the efficiency that can be obtained can be maintained even if the number of selectable parameters is reduced.

EXAMPLE OF A TRIFOCAL LENS

Incidentally, the diffraction structure having three orders of −1-order, 0-order, and +1-order can be obtained by lowering a phase shift in a height or depth direction of formula (1), and the diffraction structure having three orders can be obtained when the height or depth of formula (1) is in a range of 0<|q|≤1. FIG. 12 shows a sectional structure of the diffractive lens structure in this case, and FIG. 13 shows a sectional view of the diffractive multifocal lens of three focuses formed by combining the diffractive lens structure shown in FIG. 12 and the refractive lens structure having a convex lens shape. As shown in FIG. 12, when parameter q of the diffraction structure is set in the aforementioned range, parallel lights are divided into three diffraction orders of −1-order, 0-order, and +1-order, and by combining the diffraction structure and the refractive lens structure, an image can be formed on three focuses as shown in FIG. 13. FIG. 13 is a view showing the structure of the diffractive multifocal lens, being the trifocal lens, which is formed by combining the refraction effect and the diffraction effect. In FIG. 13, in the diffractive multifocal lens 20, a diffraction pattern having the diffraction phase structure according to the present invention is formed on an object side curved surface 21 which basically forms a convex lens, and an image side face 22 is formed in a curved surface of an ordinary convex lens, so that parallel lights L incident from the object side are condensed to three points, f1(+1-order), f2(0-order), f3(−1-order) on the optical axis O.

EXAMPLE 3-1

A case of three focuses is shown below as example 3-1. The trifocal lens with distance vision power of +20.0D and addition power of +3.0D (power for intermediate vision: +21.5D) is formed by the refractive lens structure with refractive power of +21.5D, and the diffraction structure with −1-order refractive power of −1.5D, 0-order refractive power of 0.0D, and +1-order refractive power of +1.5D. A lens with a plano-convex structure was designed for trial, wherein refractive index of PMMA lens material was $n_s$=1.493, refractive index of aqueous fluid as a medium was $n_o$=1.336, designed wavelength was 546.074 nm, curvature radius was 7.30 mm with anterior surface formed as a spherical surface and having a diffraction structure, lens diameter was 6.0 mm with a posterior surface formed as a planar surface, lens edge thickness was 1.0 mm, and center thickness was 1.64 mm having a plano-convex structure. The diffraction phase structure was expressed by formula (1), and optimization was achieved by formula (9) under conditions of five parameters $p_1$, $p_2$, q, w, σ selected for optimization, weight $W_m$ for optimization expressed by $W_{-1}=W_0=W_{+1}=1$, and target efficiency expressed by $\eta_{T-1}=0.450$, $\eta_{T0}=0.200$, $\eta_{T+1}=0.350$, to determine and design the diffraction structure by selecting each parameter and evaluate the optical performance. Results thereof are shown in table 4-1-1, and the diffraction phase structure in the case of one period without smoothing (broken line) and in the case of one period with Gaussian smoothing (solid line) is shown in FIG. 14, and a specific ruggedness surface shape and the dimension (surface sag) of the Gaussian diffraction structure is shown in FIG. 15.

TABLE 4-1-1

| Parameter | | Without smoothing | Gaussian smoothing |
|---|---|---|---|
| $p_1$ | | 0.05334188 | 0.11098808 |
| $p_2$ | | 0.10381755 | 0.12798997 |
| q | | 0.74475933 | 0.83021678 |
| w | | 0.24399766 | 0.24800000 |
| σ | | 0 | 0.04708354 |
| Actual optimized efficiency $\eta_m$ (Target efficiency $\eta_{Tm}$) | $\eta_{-1}$ (0.450) | 0.399 | 0.407 |
| | $\eta_0$ (0.200) | 0.152 | 0.170 |
| | $\eta_{+1}$ (0.350) | 0.289 | 0.307 |
| Total | (1.000) | 0.840 | 0.884 |

When the totals of the actually obtained efficiencies are compared between example 1, examples 2-1, 2-2, and the actually obtained efficiency, it is found from the above-described results, that the total of the efficiencies is large in the case without smoothing and in the case with smoothing, by utilizing the 0-order efficiency. Further, regarding the difference in totals of the efficiencies of three-orders in the cases with Gaussian smoothing and without Gaussian smoothing, the total of the efficiency in the case with Gaussian smoothing is higher, and as shown in examples 2-1 and 2-2, this is because 0-order efficiency is also generated by smoothing an edge portion of the phase structure without smoothing, utilizing Gaussian smoothing, thus increasing utilization rate of the efficiencies by Gaussian smoothing.

Further, when actual value $\eta_m$ of each order is converted at such a ratio that the value of totaling all values of each order is 1 in the actual efficiency $\eta_m$ of the diffraction structure in the case without smoothing and in the case with Gaussian smoothing, the efficiency of each order is shown in table 4-1-2.

TABLE 4-1-2

| Actual optimized efficiency $\eta_m$ (Target efficiency $\eta_{Tm}$) | Without smoothing Conversion efficiency (actual efficiency $\eta_m$) | Gaussian smoothing Conversion efficiency (actual efficiency $\eta_m$) |
|---|---|---|
| $\eta_{-1}$ (0.450) | 0.475 (0.399) | 0.460 (0.407) |
| $\eta_0$ (0.200) | 0.181 (0.152) | 0.192 (0.170) |
| $\eta_{+1}$ (0.350) | 0.344 (0.289) | 0.347 (0.307) |
| Total (1.000) | 1 (0.840) | 1 (0.884) |

It is found from the above-described results, that although the total of the actually obtained efficiencies is lower than the total of the target efficiencies similarly to the example 1, and examples 2-1 and 2-2, values approximately as designed can be obtained in each order, when the rate is taken into consideration from the total of the actually obtained efficiencies.

FIG. 14 and FIG. 15 show the case of one period without smoothing (solid line) and in the case of one period with Gaussian smoothing (broken line) according to example 1 and example 2.

When the diffraction phase structure and the ruggedness surface shape (surface sag) of the Gaussian diffraction structure are compared, it is found that in example 3-1, distribution occurs at three different orders by reducing the depth q, and an image is formed on three focuses. Further, in this example, q is in a range of 0<q≤1. However, when q is in a range of 0>q≥−1, the phase of the phase structure is formed in an upper direction of 0 of π radian and the surface sag (μm). However, the results of the efficiency, etc., are same.

Further, the surface sag becomes shallow by reducing the depth q, thus remarkably exhibiting the effect of smoothing, and effects of improving machinability and suppressing depositions, etc., on the surface of the lens, can be expected.

EXAMPLE 3-2

Example 3-2 also shows three focuses. Under similar conditions as the conditions of the example 3-1 excluding a point that the formula (11) was used for obtaining the diffraction structure satisfying $p_1=p_2=p$, w=0.25, the optical performance was designed by optimization using formula (9), with target efficiencies expressed by $\eta_{T-1}=0.450$, $\eta_{T0}=0.200$, and $\eta_{T+1}=0.350$, and two parameters selected to be p and q, and the designed optical performance was evaluated. The results thereof are shown in table 4-2-1 and table 4-2-2, and FIG. 16 shows the diffraction phase structure in the case of one period without smoothing (broken line) and in the case of one period with Gaussian smoothing (solid line), and FIG. 17 shows the specific shape dimension of the ruggedness surface shape (surface sag) with Gaussian diffraction structure.

TABLE 4-2-1

| Parameter | | Without smoothing | Gaussian smoothing |
|---|---|---|---|
| $p = p_1 = p_2$ | | 0.08541070 | 0.12348926 |
| $q$ | | 0.74622258 | 0.83653239 |
| w (fixed) | | 0.25 | 0.25 |
| σ (fixed) | | 0 | 0.05 |
| Actual optimized efficiency $\eta_m$ (Target efficiency $\eta_{Tm}$) | $\eta_{-1}$ (0.450) | 0.404 | 0.406 |
| | $\eta_0$ (0.200) | 0.150 | 0.171 |
| | $\eta_{+1}$ (0.350) | 0.287 | 0.307 |
| Total | (1.000) | 0.841 | 0.884 |

TABLE 4-2-2

| Actual optimized efficiency $\eta_m$ (Target efficiency $\eta_{Tm}$) | Without smoothing Conversion efficiency (actual efficiency $\eta_m$) | Gaussian smoothing Conversion efficiency (actual efficiency $\eta_m$) |
|---|---|---|
| $\eta_{-1}$ (0.450) | 0.480 (0.404) | 0.459 (0.406) |
| $\eta_0$ (0.200) | 0.178 (0.150) | 0.193 (0.171) |
| $\eta_{+1}$ (0.350) | 0.341 (0.287) | 0.347 (0.307) |
| Total (1.000) | 1 (0.841) | 1 (0.884) |

It was found from the results of table 4-2-1, table 4-2-2, and FIG. 16 and FIG. 17, that similar results as the results of the example 3-2 and example 3-1 could be obtained.

Further, although the number of selectable parameters is five in the example 3-1 and two in the example 3-2, the obtained efficiencies are approximately the same in the case with Gaussian smoothing and in the case without smoothing, and it is found that the obtained efficiency can be maintained even if the number of selectable parameters is reduced by optimization performed to be close to the target efficiency.

<Calculation Efficiency by the Number of Parameters>

In order to compare calculation efficiencies by the number of parameters, example 3-2 and example 3-1 were compared by measuring a required time from start to end of calculation by using a personal computer, and the results thereof were shown in table 5. A commercially available personal computer was used, which was CPU Intel Pentium (registered trademark) D830 (dual core CPU, LGA 775 FSB 800 MHz, actual clock 3.0 GHz, 1 MB cache for each core) produced by Intel Corporation US, in which memory of 2 GB is installed.

TABLE 5

| | Number of parameters | Variable | Required time (sec) |
|---|---|---|---|
| Example 3-1 | 5 | $p_1, p_2, q, w, \sigma$ | 337.68 |
| Example 3-2 | 2 | $p = p_1 = p_2, q$ w = 0.25, σ = 0.05 | 78.62 |

It is found from the above-described results, that the calculation efficiency depending on the number of parameters is completely different, and as shown in the comparison among example 2-1, example 2-2, example 3-1, and example 3-2, optimization can be carried out in a short time by reducing the number of parameters, without lowering the efficiency obtained by optimization so as to be close to the target efficiency.

<Evaluation by a Prototype>

Next, the diffractive multifocal lens according to each example of the example 1, example 2-2, and example 3-2 was actually manufactured and resolution power thereof was evaluated. Prototype 1, prototype 2-2, and prototype 3-2 will be described hereafter respectively.

(Evaluation Result of the Resolution Power Through Iso Model Eye)

Regarding prototype 1, prototype 2-2, and prototype 3-2 respectively which are obtained for trial, resolution powers were evaluated by photographing an image of a 1951 USAF test pattern chart (based on MIL-STD-150A, Section 5.1.1.7, Resolving Power Target) in a state of a black background and a transparent negative type test pattern for evaluating the resolution power at a distance where the image was formed by automatic focus in a best focus condition, which is a maximum contrast value of 50 c/mm of the MFT value (Modulus of the Optical Transfer Function), through ISO model eye (based on ISO 11979-2 Annex C, Measurement of MTF, Model eye) produced by Trioptics Inc., with distilled water put in the IOL constant measuring device (Optispheric IOL) produced by Trioptics Inc. Germany, and an aperture set to 3.0 mm.

FIG. 18 is a view showing a result of capturing the 1951 USAF test pattern chart of the prototype 1 of the multifocal lens through the ISO model eye, FIG. 19 is a view showing a capturing result of the prototype 2-2 of the multifocal lens, and FIG. 20 is a view showing the photograph result of the prototype 3-2 of the multifocal lens.

As shown in FIG. 18 and FIG. 19, similarly to the result described in the aforementioned example 1 and example 2-2, variation of the efficiencies in the near vision and the distance vision could be confirmed by the chart of the 1951 USAF test pattern chart of the prototype 1 and the prototype 2-2. Further, similarly to the result described in the explanation of the example 3-2, image formation on the focus of the power for intermediate vision could be confirmed in the prototype 3-2 of FIG. 20, without reducing the efficiencies of the distance vision and the near vision. Further, it is confirmed whether the image is formed on the focus by automatic focusing in a case of the power for intermediate vision of the prototype 1 and the prototype 2-2, however, there was no focus between the distance vision and the near vision, where the image formation was confirmed by auto focusing.

(Confirmation of the Surface Sag)

Regarding the surface sag of the prototype 1, prototype 2-2, and prototype 3-2, the Surface sag was measured by highly precise three-dimensional measuring machine UA3P produced by Panasonic Factory Solutions Inc., wherein distance of a level difference of a measurement surface with respect to a reference surface obtained by flattening a curved surface of a refraction structure of the prototype Zd-AXIS (μm) was taken on a vertical axis, and distance from the center of the lens R-AXIS (mm) was taken on a horizontal axis. FIG. 21-1, FIG. 22-1, and FIG. 23-1 show charts of the surface sag, and numerical values of each measurement point are corrected from a designed value corresponding to the aforementioned surface sag, so that the chart of the Surface sag measurement is set in a flat state. The numerical values thus obtained are plotted and compared in FIG. 21-2, FIG. 22-2, and FIG. 23-2, with respect to the ruggedness shape shown in FIG. 4, FIG. 11, and FIG. 17, being the ruggedness shape (surface sag) of the Gaussian diffraction structure.

As a result of the comparison, it was found that plots of the solid line of the designed value and the broken line of the measured value were approximately overlapped on each other and all prototype 1, prototype 2-2, and prototype 3-2 have the phase structure close to the designed value, and good machinability by smoothing was confirmed.

(Measurement of Power (Intraocular Power Conversion))

Next, powers of the prototype 1, prototype 2-2, prototype 3-2 were obtained from a focal length of an effective focal length measurement value in a best focus condition in spatial frequency of MTF50 c/mm in a water immersion condition, by converting above powers to intraocular powers of the intraocular lens, by using the IOL constant measuring device Optispheric IOL produced by Trioptics Inc., Germany. Results thereof were shown in table 6. The designed value of the table 6 is an estimated value of the intraocular power, and a measured value is a value of n=1.333 due to water immersion, and the value was converted to the intraocular power based on ISO11979-2 Annex A, Measurement of Dioptric Power, under condition of refractive index of aqueous fluid, being a medium: $n_o$=1.336, spatial frequency: MTF50 c/mm, and pupil diameter: $\phi$=3.0 mm.

TABLE 6

|  | Value | | | Mesured value intraocular conversion (immersion into water φ3 mm) | | |
| --- | --- | --- | --- | --- | --- | --- |
|  | Power for distance vision (D) | Power for intermediate vision (D) | Addition power (D) | Power for distance vision (D) | Power for intermediate vision (D) | Addition power (D) |
| Prototype 1 | 20.0 | — | 3.0 | 19.93 (20.67) | — | 3.01 |
| Prototype 2-2 | 20.0 | — | 3.0 | 19.89 (20.62) | — | 3.08 |
| Prototype 3-2 | 20.0 | 21.5 | 3.0 | 19.93 (20.66) | 21.47 (22.20) | 3.02 |

Since the addition power is generated by the diffraction structure, the power is not influenced by the variation of the refractive indexes of the medium and as is clarified from table 6, there is almost no difference between the measured value and the designed value of the powers of the prototype 1, prototype 2-2, and prototype 3-2 respectively.

(Measurement of Modulation Transfer Function (Modulus of the Optical Transfer Function (MTF) and defocus characteristics (Through Focus Response (TFR))

MTF curve is shown in a graph, with spatial frequency taken on the horizontal axis, and contrast characteristics taken on the vertical axis, wherein contrast characteristics are shown by using a test pattern having a specific spatial frequency with equal black and white intervals. TFR chart is a chart in which an image plane defocusing amount (D) is taken on the horizontal axis, and MTF value is taken on the vertical axis, and TFR curve is drawn on the graph. An image plane defocusing amount was measured based on ISO-11979-9, by moving backward and forward a distance from a reference image plane to a measured plane, which is the distance where the image is formed on −1-order focus, so that the MFT is plotted with the image plane defocusing amount.

In order to evaluate the imaging characteristics as an evaluation of the resolution power characteristics of the prototype 1, prototype 2-2, and prototype 3-2, the Modulation Transfer Function (Modulus of the Optical Transfer Function (MTF)) and defocusing characteristics (Through Focus Response (TFR) were measured in a best focus in the water immersion condition and at spatial frequency of MTF 50 c/mm, by using the IOL constant measuring device Optispheric IOL produced by Trioptics Inc., Germany. Results of the measurement are shown in FIG. 24-1 to FIG. 24-3, FIG. 25-1 to FIG. 25-3, and FIG. 26-1 to FIG. 26-4. FIG. 24-1 is a plot showing the MTF (distance vision) of the prototype 1, and FIG. 24-2 is a plot showing the MTF (near vision) of the prototype 1, and FIG. 24-3 is a plot showing the TFR of the prototype 1. Further, FIG. 25-1 is a plot showing the MTF (distance vision) of the prototype 2-2, FIG. 25-2 is a plot showing the MTF (near vision) of the prototype 2-2, and FIG. 25-3 is a plot showing the TFR of the prototype 2-2. Further, FIG. 26-1 is also the plot showing the MTF (distance vision) of the prototype 3-2, FIG. 26-2 is a plot showing the MTF (near vision) of the prototype 3-2, FIG. 26-3 is a plot showing the MTF (intermediate vision) of the prototype 3-2, and FIG. 26-4 is a plot showing the TFR of the prototype 3-2.

It was found that values of the distance vision and the near vision of the MTF were inverted in the MTF and TFR of the prototype 1 and the prototype 2-2, and the heights of the peaks were also inverted in −1-order and +1-order TFR. This reveals that the efficiency of the aforementioned example can be controlled and also the efficiencies of the distance vision and the near vision can be controlled similarly to the aforementioned measurement results obtained by ISO model eye. Further, when the MTF and the TFR were compared between the prototype 1, prototype 2-2, and prototype 3-2, it was found that values of the MTF of the distance vision and the near vision were not reduced so much, and a peak of the TFR was observed at an intermediate point between the distance vision and the near vision, thus making it possible to obtain a trifocal lens. Accordingly, it was found that the efficiency of the aforementioned example could be controlled and also the efficiencies of the distance vision and the near vision could be controlled similarly to the measurement results obtained by the ISO model eye.

EXAMPLE 4

The diffractive multifocal lens according to example 4 is an example of forming an intraocular lens by using the diffractive multifocal lens of the present invention. Explanation will be given hereafter.

Thermal polymerization was carried out based on a polymerization program, in such a manner that a mixture of n-butyl acrylate (n-BA: see structural formula 1): 42 g, phenyl ethyl methacrylate (PEMA: see structural formula 2): 52 g, perfluoro octyl ethyl oxy propylene methacrylate (HRM-5131HP: see structural formula 3): 8 g, ethylene glycol dimethacrylate (EDMA): 5 g, and AIBN: 0.33 g was prepared and ultraviolet absorbing agent T-150 (see structural formula 4): 1.5 wt %, and reactive yellow dye HMPO-B (see structural formula 5): 0.02 wt % with respect to total quantities of such monomers for lens, were added thereto, which was then sufficiently stirred while passing nitrogen gas, and a polymerizable material thus obtained was put in a support ring made of PMMA and was heated for 30 minutes from room temperature to 60° C., and was retained for 12 hours at 60° C., then heated for 15 minutes from 60° C. to 90° C. and was retained for 3 hours at 90° C., and was heated for 15 minutes from 90° C. to 100° C. and was retained for 12 hours at 100° C., and was naturally cooled to room temperature. A polymer substance thus obtained was machined by a die lathe UPL-240H produced by RIKEN SEIKO CO., LTD. The lens of the example 4 thus obtained is a diffractive multifocal intraocular lens, with a lens anterior surface formed in a spherical surface, and a lens posterior surface formed in a combination of the spherical surface and a Gaussian diffraction structure. The multifocal intraocular lens thus obtained had a refractive index of 1.516, efficiencies of distance vision: 45%, intermediate vision: 17%, and near vision: 26%, power: +20.0D, and addition power: +3.5D. Note that FIG. 27 is a plot showing the diffraction phase structure of the diffraction pattern of the diffractive multifocal lens according to the example 4.

[Chemical formula 1]

(Structural formula 1)

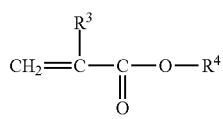

$R^3$:Hydrogen atom $R^4$:Butyl group

[Chemical formula 2]

(Structural formula 2)

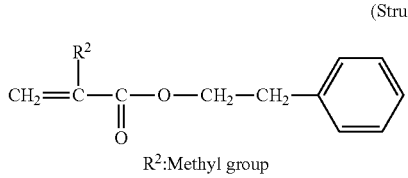

$R^2$:Methyl group

[Chemical formula 3]

(Structural formula 3)

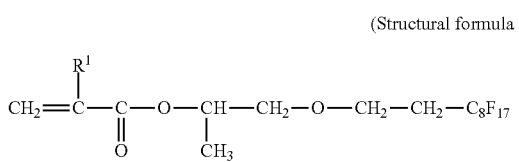

$R^1$:Methyl group

[Chemical formula 4]

(Structural formula 4)

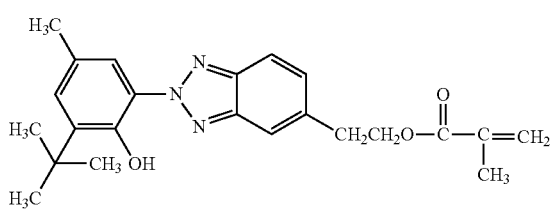

[Chemical formula 5]

(Structural formula 5)

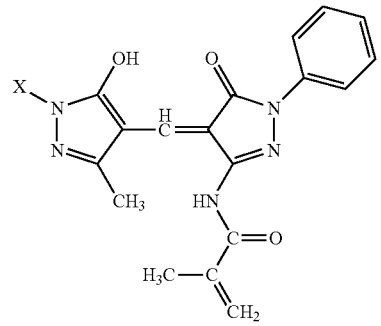

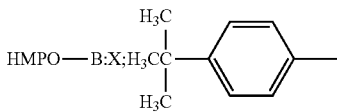

(Comparison of Halo and Glare Between the Lens of Example 4 and a Commercially Available Lens)

An image simulation through model eye was carried out, for comparing the halo and glare between the example 4 and comparative examples, and two kinds of commercially available lenses of comparative example A having the diffraction phase structure of the diffraction pattern of FIG. 28, and the comparative example B having the diffraction phase structure of the diffraction pattern of FIG. 29. The image simulation through model eye was carried out based on a HOYA model eye system (structure: cornea spherical surface lens, a water tank, an intraocular lens jig, color CCD camera), and results thereof will be described hereafter. Two light sources for test were used, with first light source (electric bulb for verifying glare) arranged at a position of 4 m, and a second light source (a point light source for verifying halo) arranged at a position of 6 m, which were then installed in the model eye system produced by HOYA, and a distance focus of the multifocal lens was adjusted to 6 m. Brightness of the second light source was adjusted under a condition of allowing a halo pattern to appear. The constant brightness and shutter speed setting of the camera are used for capturing all samples. Table 7 shows the model eye parameter of the model eye system produced by HOYA, and FIG. 30 (in a case of pupil diameter: $\phi$=3.0 mm) and FIG. 31 (in a case of pupil diameter: $\phi$=4.5 mm) show the results of the image simulation through model eye.

TABLE 7

| Eye model parameter of eye model system by HOYA | | | |
|---|---|---|---|
| | Curvature radius (mm) | Thickness (mm) | Refractive index |
| Cornea front face | 7.8 | 0.55 | 1.3771 |
| Cornea rear face | 6.5 | 4.07 | 1.333 |

Results of the simulation of the comparative example A, comparative example B, and example 4 were examined. The light source in the upper part of each figure is an electric bulb for verifying glare, and in the lower part is regarding the point light source for verifying halo, and an enlarged view is attached for the point light source for verifying halo. When glare is compared, glare is considerably large in the comparative example A which has a conventional blazed diffraction structure, and the glare is relatively small in the comparaexample B which has an apodized diffraction structure. When the glare of the example 4 was compared with the glare of the diffractive multifocal intraocular lens, it was confirmed that the glare was smaller in the Gaussian diffraction optical structure, than the glare of the conventional blazed diffraction structure, and the glare was equal to each other in the apodized diffraction structure. Halo was not confirmed in any one of the lenses.

Note that the aforementioned example is the example of a combination of the diffraction pattern formed on an object side face, and the refractive lens. However, the diffraction pattern may also be formed on an image side face. Further, the surface on which the diffraction pattern is formed, may be formed in a planar surface, so that a desired optical performance can be obtained.

Industrial Applicability

The multifocal lens of the present invention is useful as an optical element, and although its purpose of use is not particularly limited thereto, the multifocal lens of the present invention can be applied to the optical element, and ophthalmic distance vision and near vision corrective ocular lenses (such as spectacles, contact lens, and implantable lens such as intraocular lens).

BRIEF DESCRIPTION OF THE DRAWINGS

FIG. 21-1 is a view showing a chart for measuring Surface sag of the prototype 1.

FIG. 21-2 is a plot showing a numerical value at each measurement point by plotting, which is corrected so that the chart of the surface sag measurement of the prototype 1 is set in a flat state.

FIG. 22-1 is a plot showing a chart for measuring the Surface sag of prototype 2-2.

FIG. 22-2 is a plot showing the numerical value of each measurement point by plotting, which is corrected so that the chart of the surface sag measurement of the prototype 2-2 is set in a flat state.

FIG. 23-1 is a plot showing a chart for measuring the Surface sag of prototype 3-2.

FIG. 23-2 is a plot showing the numerical value of each measurement point by plotting, which is corrected so that the chart of the surface sag measurement of the prototype 3-2 is set in a flat state.

FIG. 24-1 is a plot showing MTF (distance vision) of the prototype 1.

FIG. 24-2 is a plot showing MTF (near vision) of the prototype 1.

FIG. 24-3 is a plot showing TFR of the prototype 1.

FIG. 25-1 is a plot showing MTF (distance vision) of the prototype 2-2.

FIG. 25-2 is a plot showing MTF (near vision) of the prototype 2-2.

FIG. 25-3 is a plot showing TFR of the prototype 2-2.

FIG. 26-1 is a plot showing MTF (distance vision) of the prototype 3-2.

FIG. 26-2 is a plot showing MTF (near vision) of the prototype 3-2.

FIG. 26-3 is a plot showing MTF (intermediate vision) of the prototype 3-2.

FIG. 26-4 is a plot showing TFR of the prototype 3-2.

DESCRIPTION OF SIGNS AND NUMERALS

Figure 1:
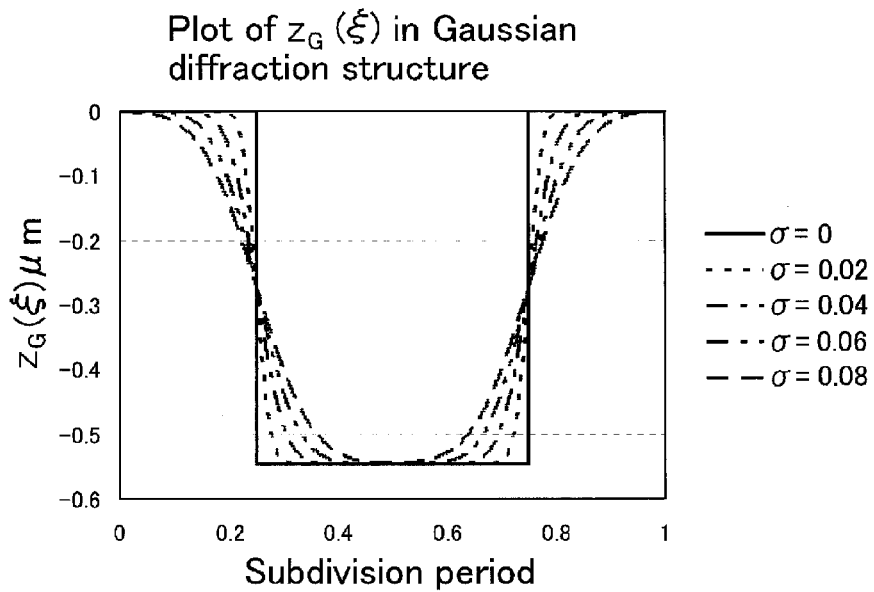
FIG. 1 is a plot showing a graph that expresses a Gaussian diffraction structure $Z_G(\xi)$.
Figure 2:
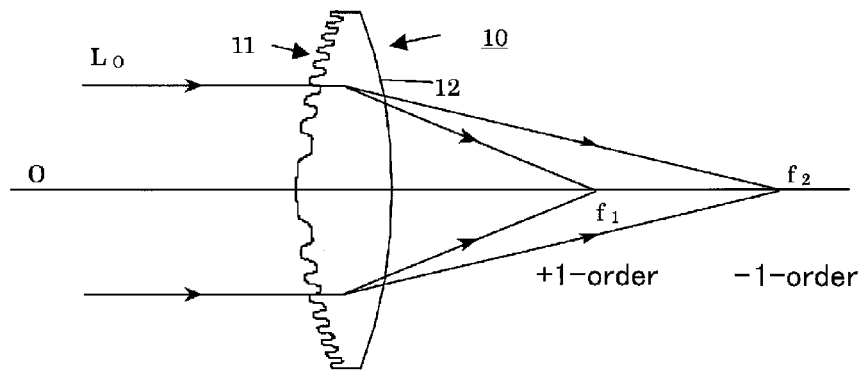
FIG. 2 is a sectional view of a diffractive multifocal lens according to an embodiment of the present invention.
Figure 3:
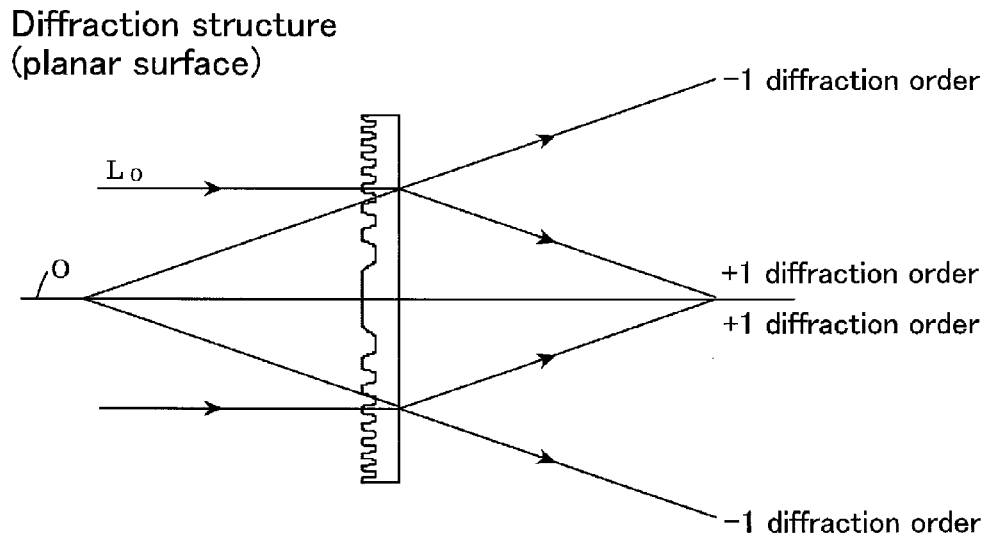
FIG. 3 is a view showing a ruggedness surface shape of a diffraction pattern formed on the diffractive multifocal lens shown in FIG. 2.
Figure 4:
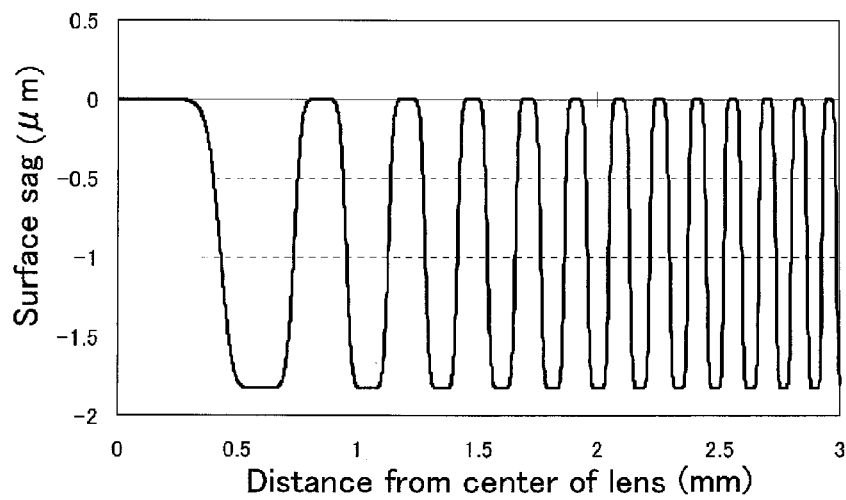
FIG. 4 is a plot showing a specific shape dimension of a diffraction pattern 11 shown in FIG. 3.
Figure 5:
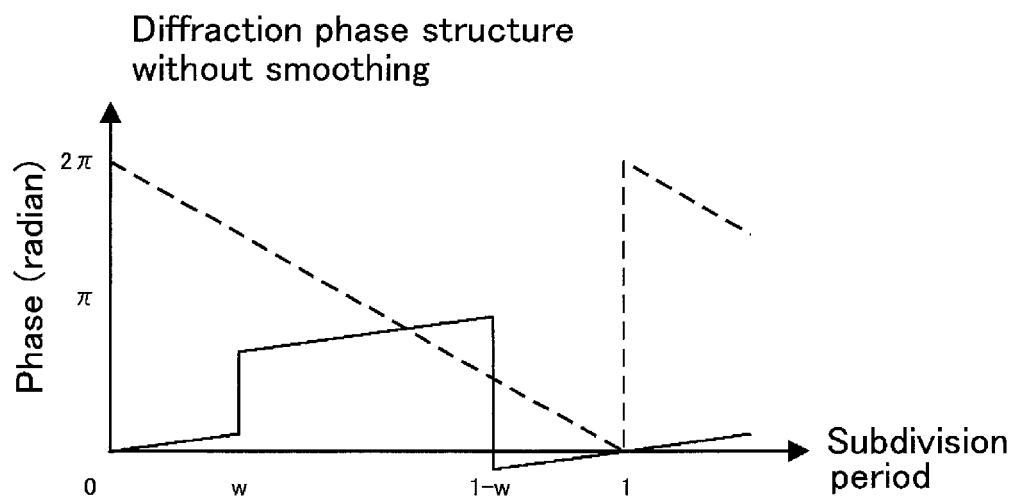
FIG. 5 is a view showing a diffraction phase structure that expresses a phase relation of light that passes through a unit diffraction pattern without smoothing.
Figure 6:
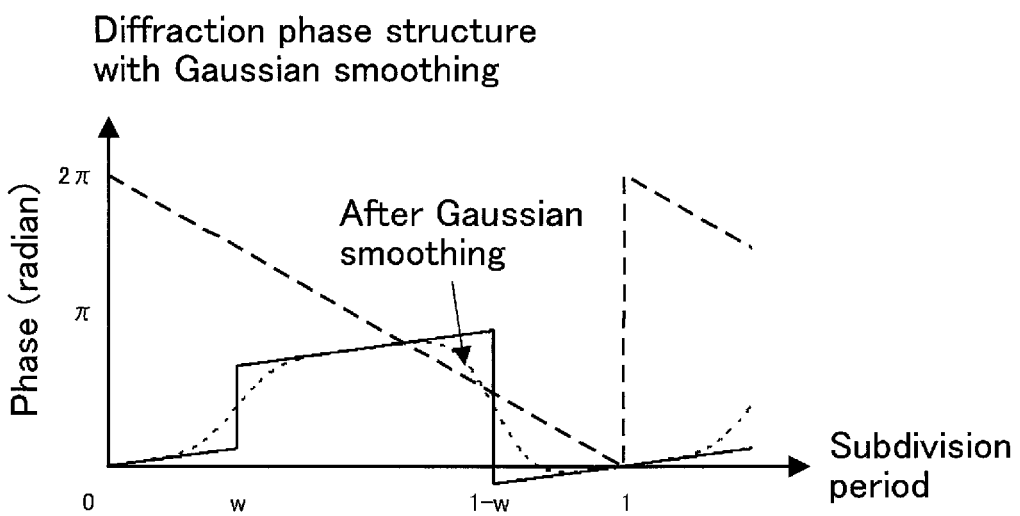
FIG. 6 is a view showing a diffraction phase structure that expresses the phase relation of light that passes through a unit diffraction pattern with smoothing.
Figure 7:
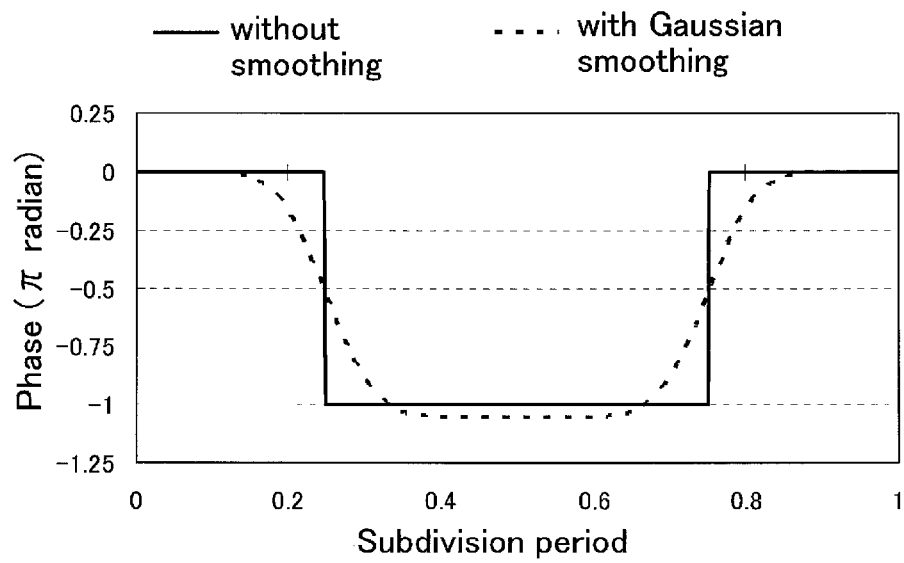
FIG. 7 is a plot showing the diffraction phase structure in a case without smoothing (broken line) and in a case with Gaussian smoothing (solid line) in one period in the diffraction pattern of the diffractive multifocal lens according to example 1.
Figure 8:
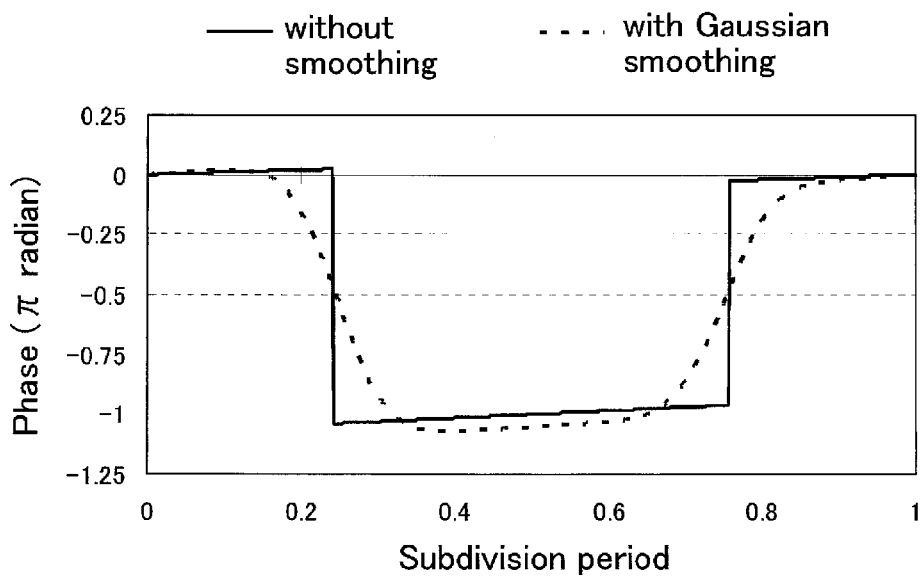
FIG. 8 is a plot showing the diffraction phase structure of a case without smoothing (broken line) and in a case with Gaussian smoothing (solid line) in one period in the diffraction pattern of the diffractive multifocal lens according to example 2-1.
Figure 9:
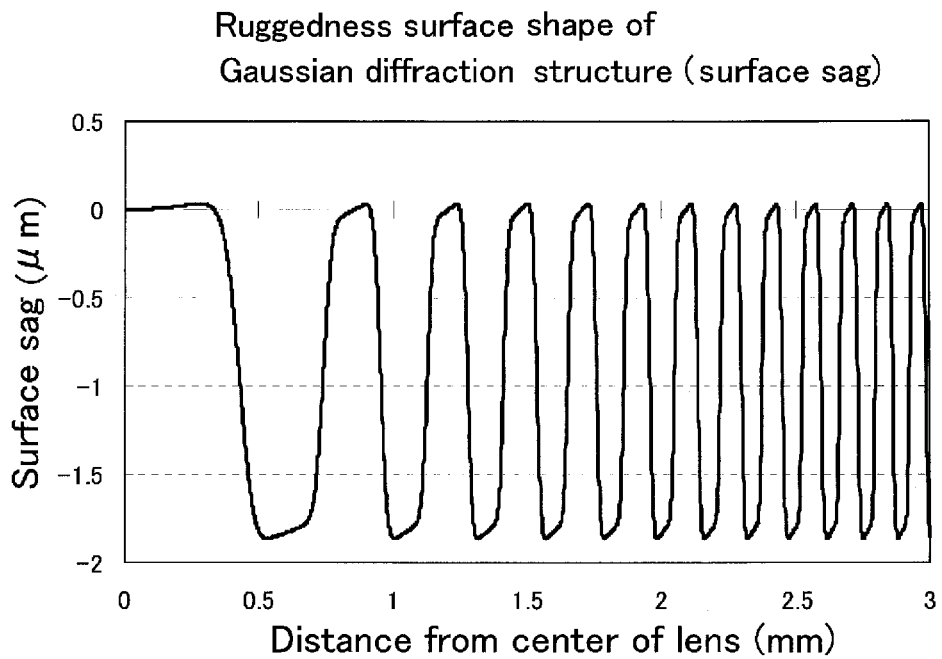
FIG. 9 is a plot showing a specific ruggedness surface shape and a dimension (surface sag) of a Gaussian diffraction structure in the diffraction pattern of the diffractive multifocal lens according to example 2-1.
Figure 10:
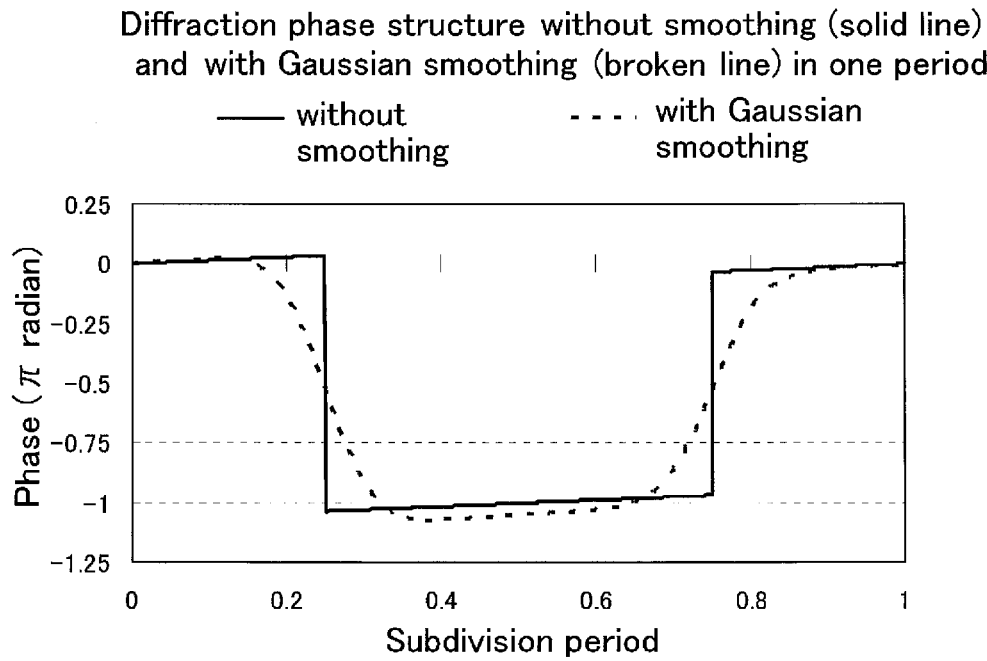
FIG. 10 is a plot showing the diffraction phase structure in a case without smoothing (broken line) and in a case with Gaussian smoothing (solid line) in one period in the diffraction pattern of the diffractive multifocal lens according to example 2-2.
Figure 11:
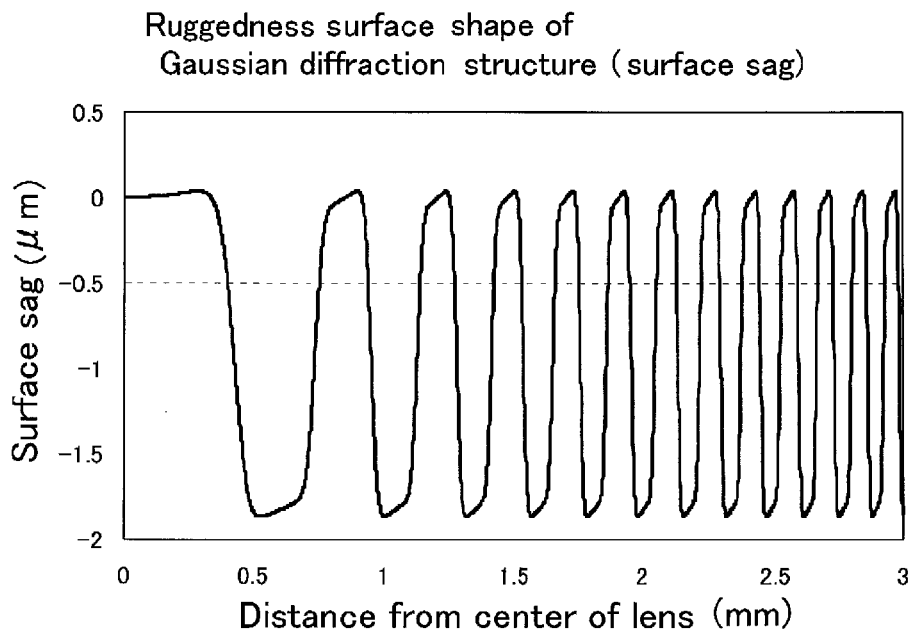
FIG. 11 is a plot showing a specific ruggedness surface shape and a dimension (Surface sag) of a Gaussian diffraction structure in the diffraction pattern of the diffractive multifocal lens according to example 2-2.
Figure 12:
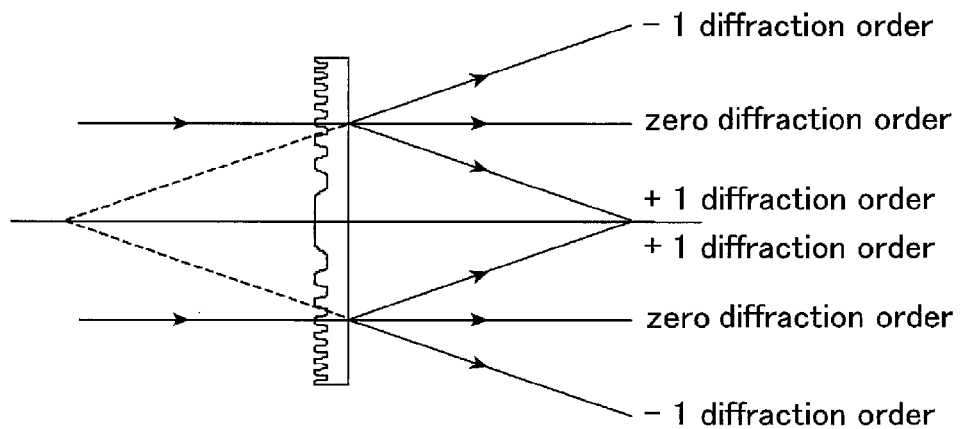
FIG. 12 is a view showing a diffractive lens structure of a trifocal diffractive multifocal lens.
Figure 13:
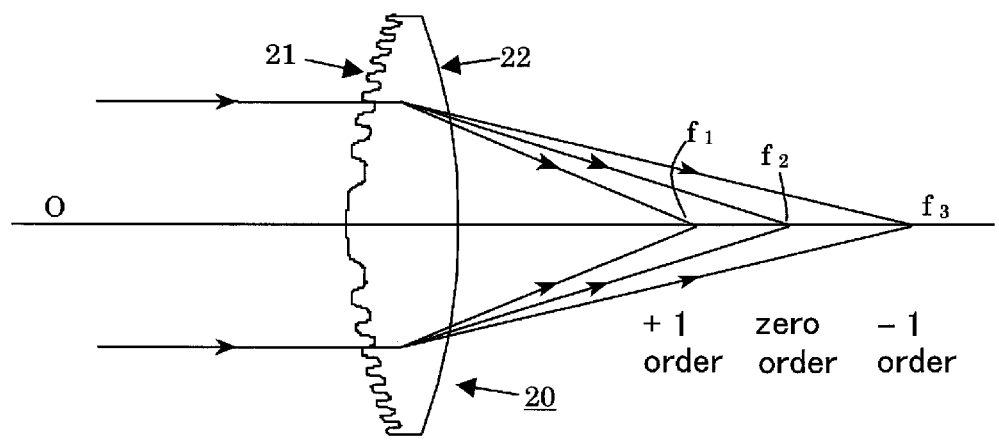
FIG. 13 is a view showing a sectional view of the trifocal diffractive multifocal lens of a combination of the diffractive lens structure shown in FIG. 12, and a refractive lens structure with a convex lens shape.
Figure 14:
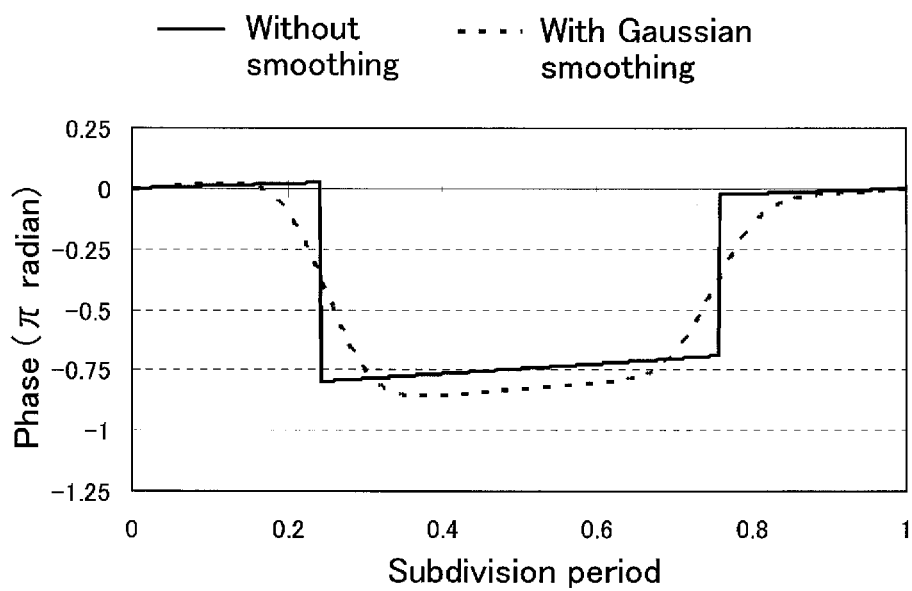
FIG. 14 is a plot showing a diffraction phase structure in a case without smoothing (broken line) and in a case with Gaussian smoothing (solid line) in one period in the diffraction pattern of the diffractive multifocal lens according to example 3-1.
Figure 15:
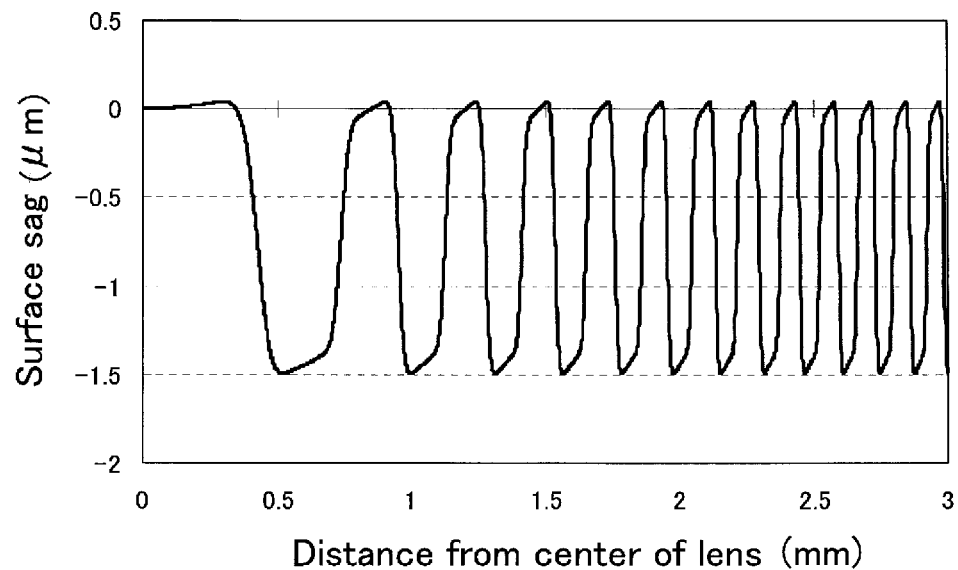
FIG. 15 is a plot showing a specific ruggedness surface shape and a dimension (Surface sag) of a Gaussian diffraction structure in the diffraction pattern of the diffractive multifocal lens according to example 3-1.
Figure 16:
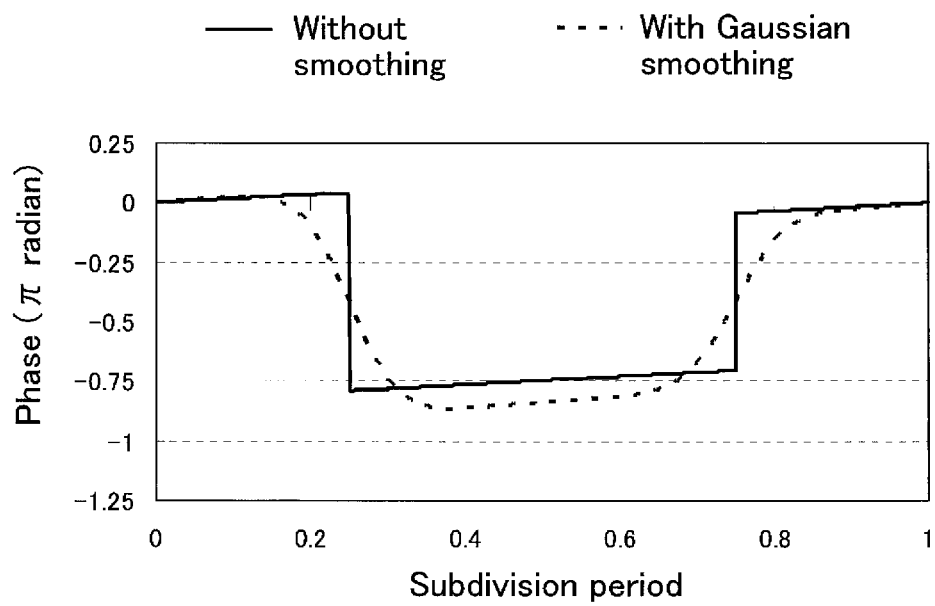
FIG. 16 is a plot showing a diffraction phase structure in a case without smoothing (broken line) and in a case with Gaussian smoothing (solid line) in one period in the diffraction pattern of the diffractive multifocal lens according to example 3-2.
Figure 17:
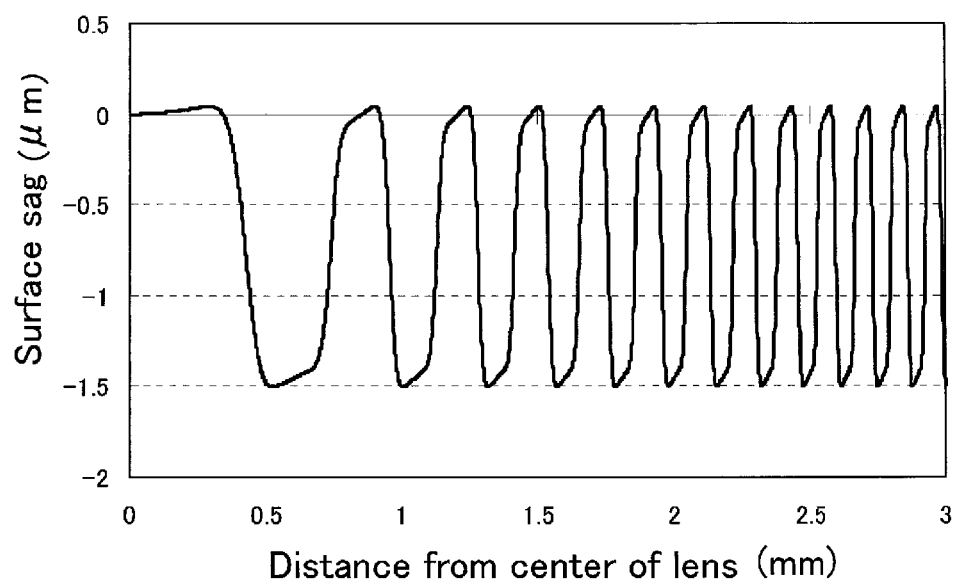
FIG. 17 is a plot showing a specific ruggedness surface shape and a dimension (Surface sag) of a Gaussian diffraction structure in the diffraction pattern of the diffractive multifocal lens according to example 3-2.
Figure 18:
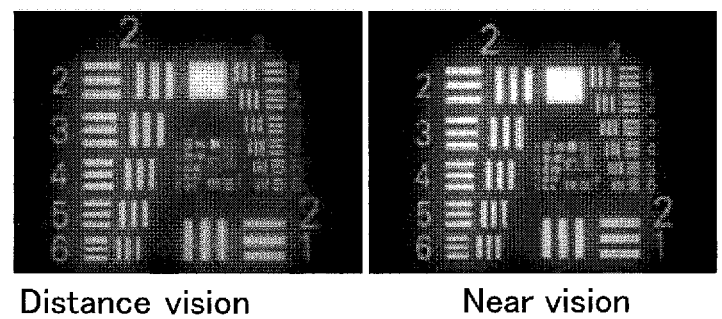
FIG. 18 is a view showing a result of capturing 1951 USAF test pattern chart of a multifocal lens of prototype 1, obtained through an ISO model eye.
Figure 19:
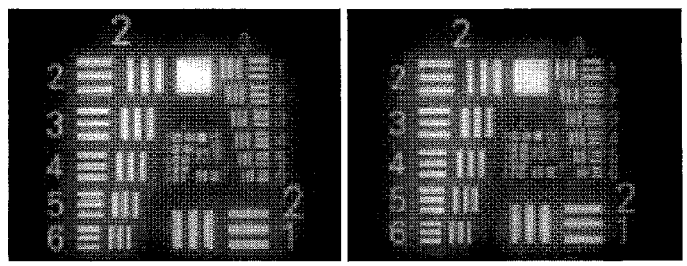
FIG. 19 is a view showing a result of capturing a multifocal lens of prototype 2-2.
Figure 20:
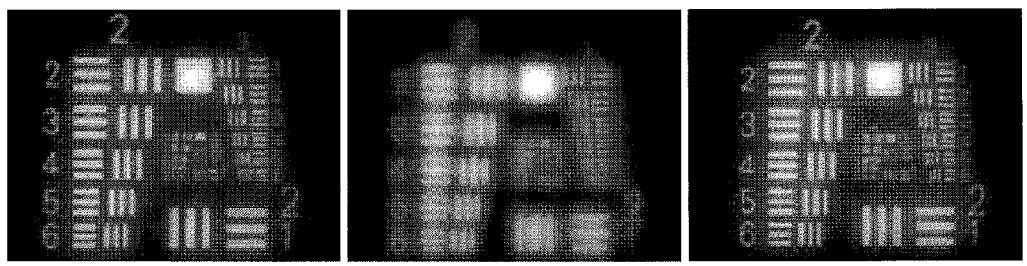
FIG. 20 is a view showing a result of capturing a multifocal lens of prototype 3-2.
Figures 1, 21:
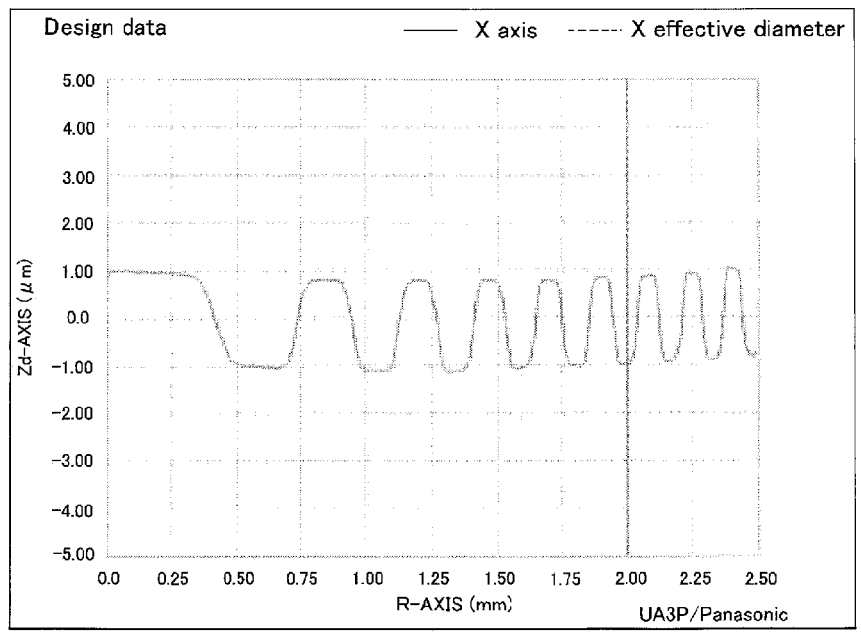
Figures 2, 21:
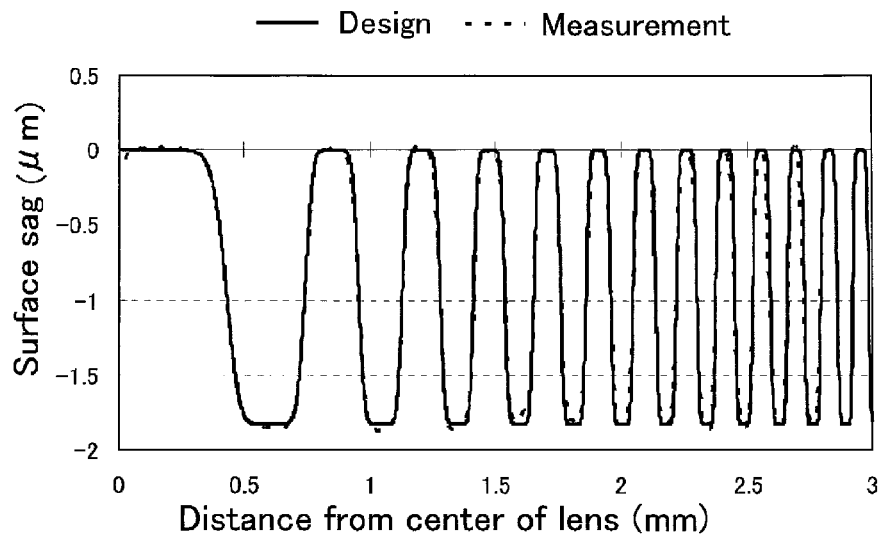
Figures 1, 22:
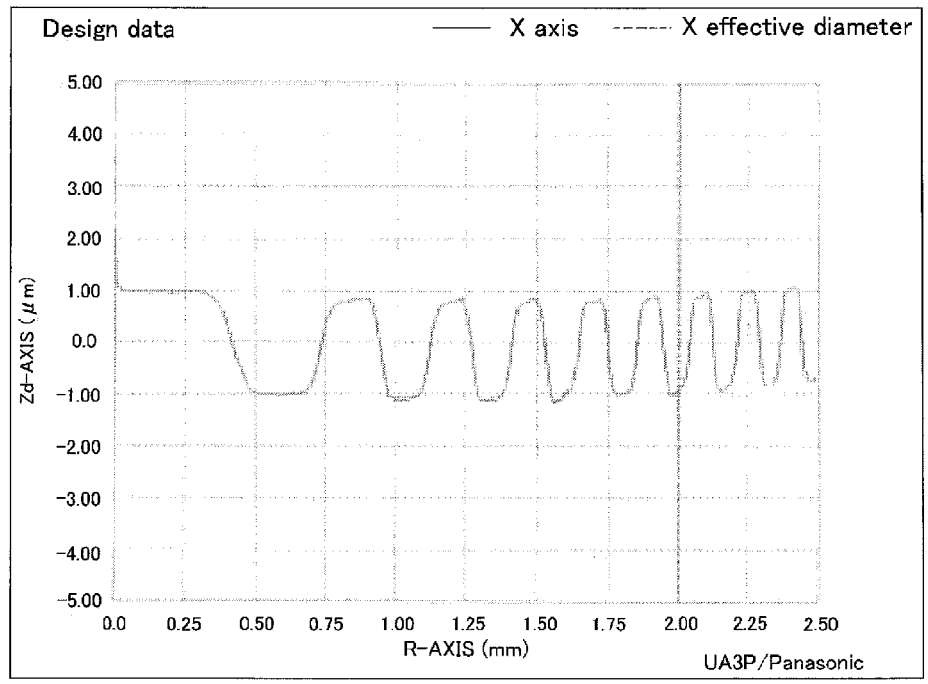
Figures 2, 22:
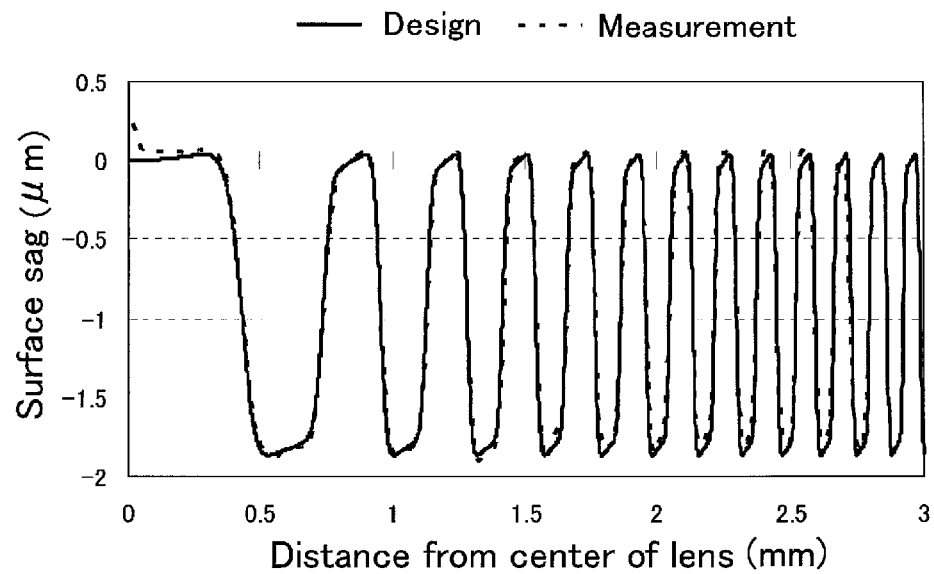
Figures 1, 23:
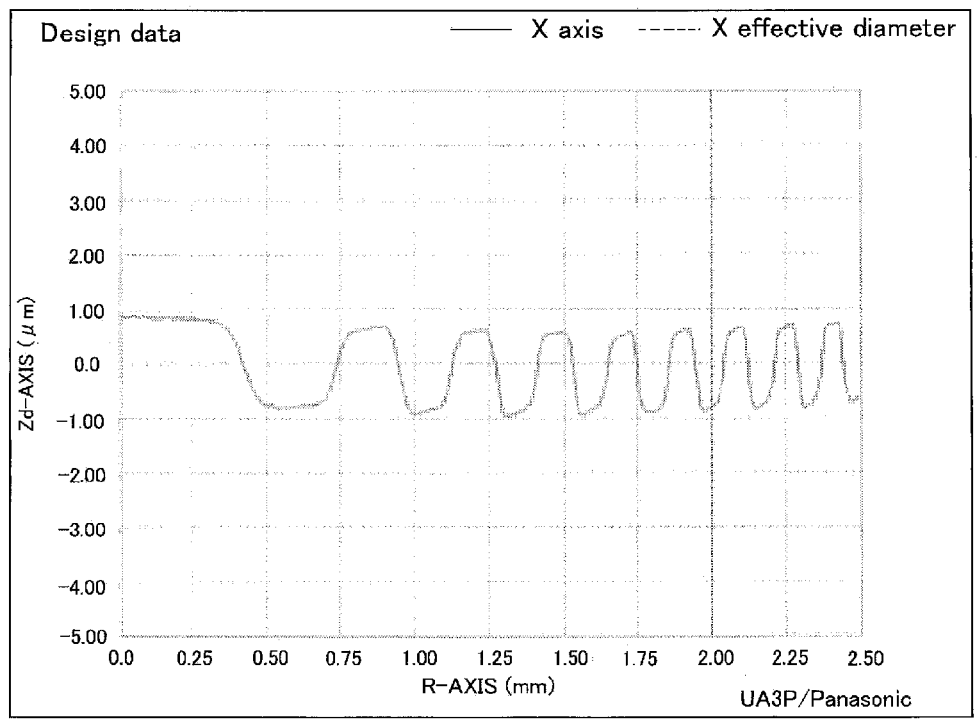
Figures 2, 23:
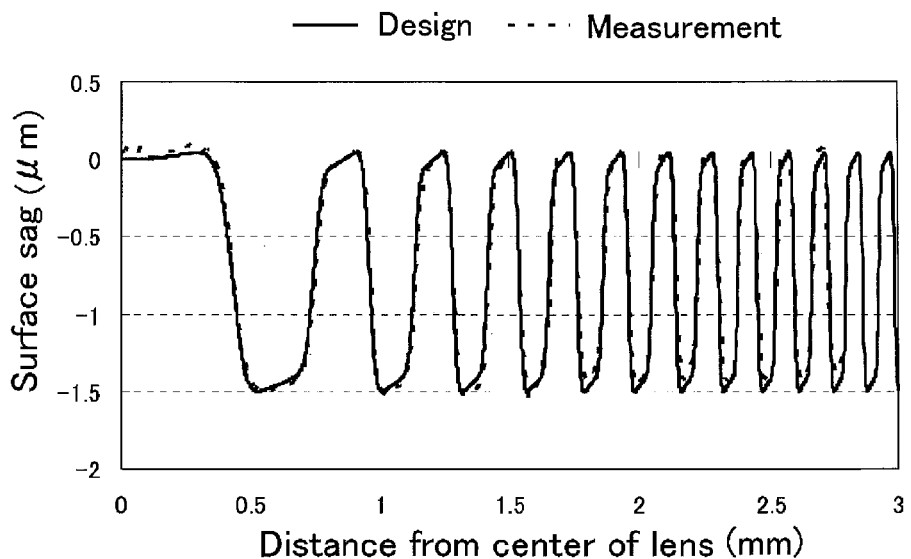
Figures 1, 24:
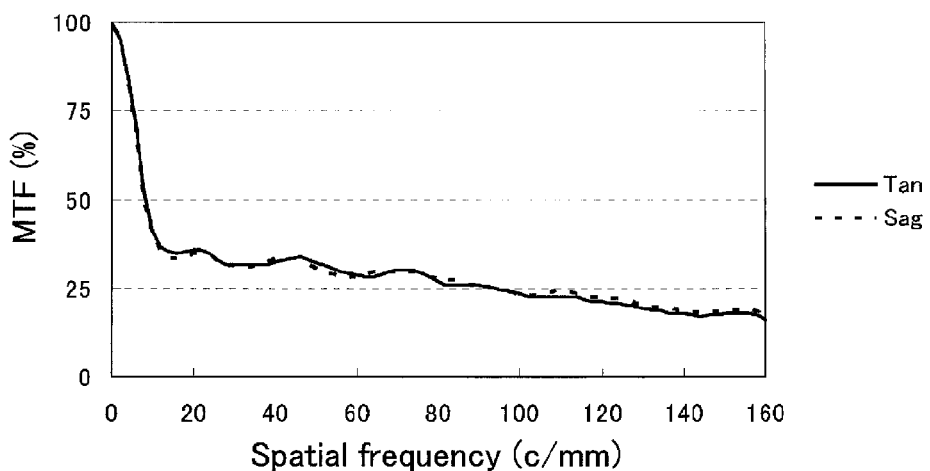
Figures 2, 24:
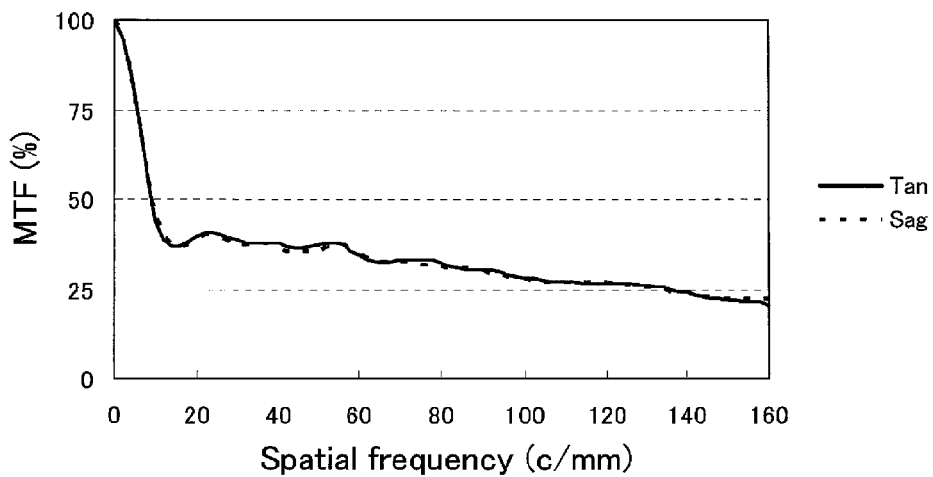
Figures 3, 24:
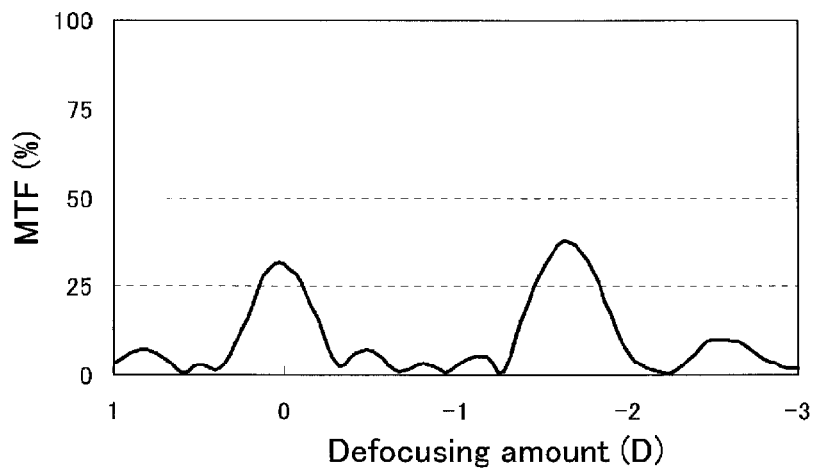
Figures 1, 25:
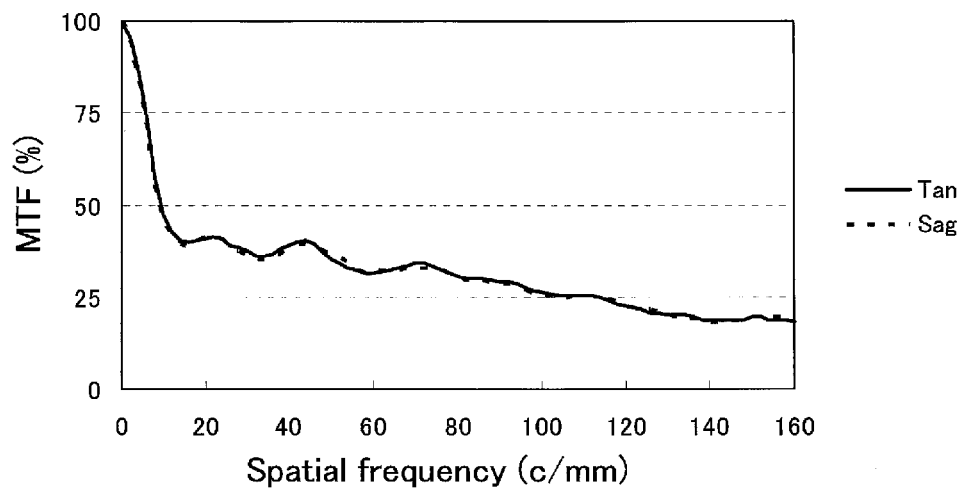
Figures 2, 25:
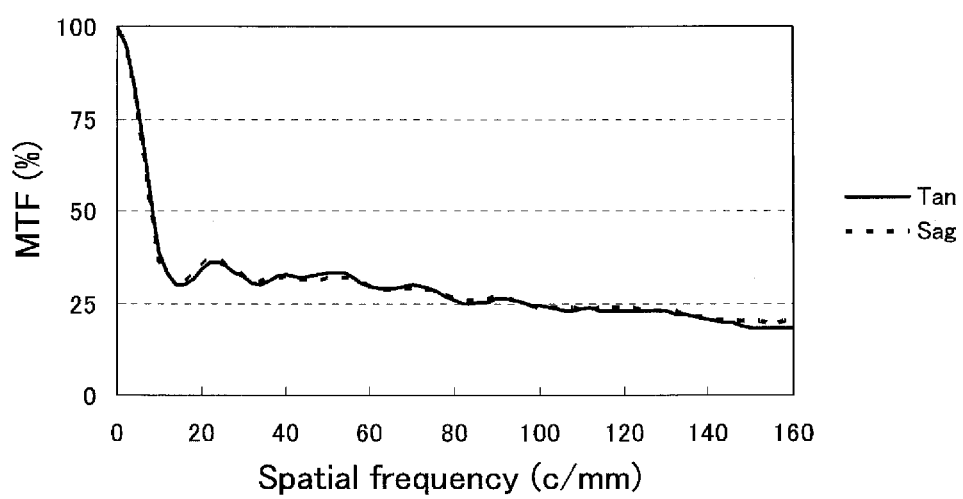
Figures 3, 25:
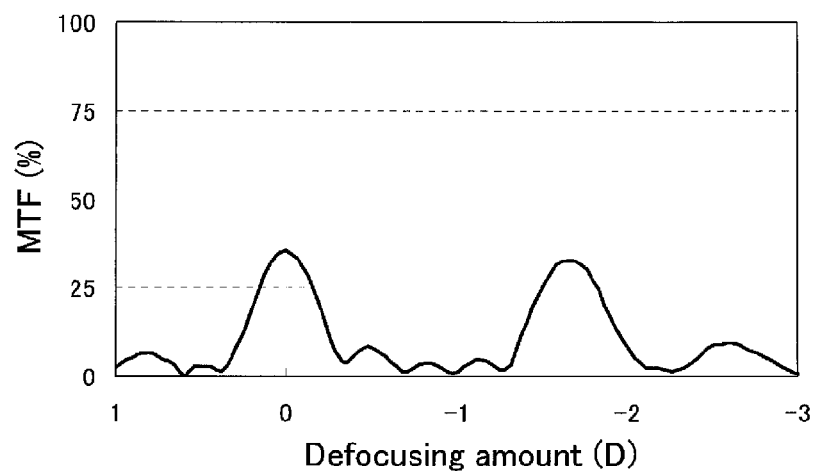
Figures 1, 26:
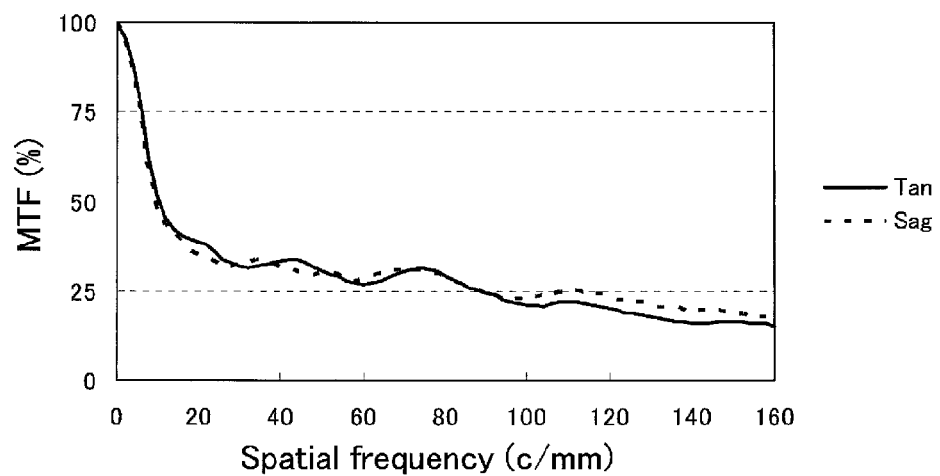
Figures 2, 26:
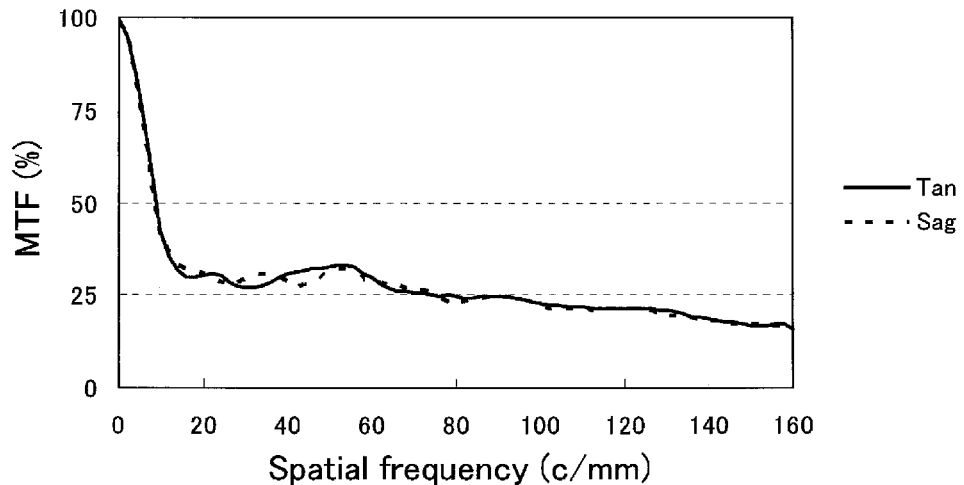
Figures 3, 26:
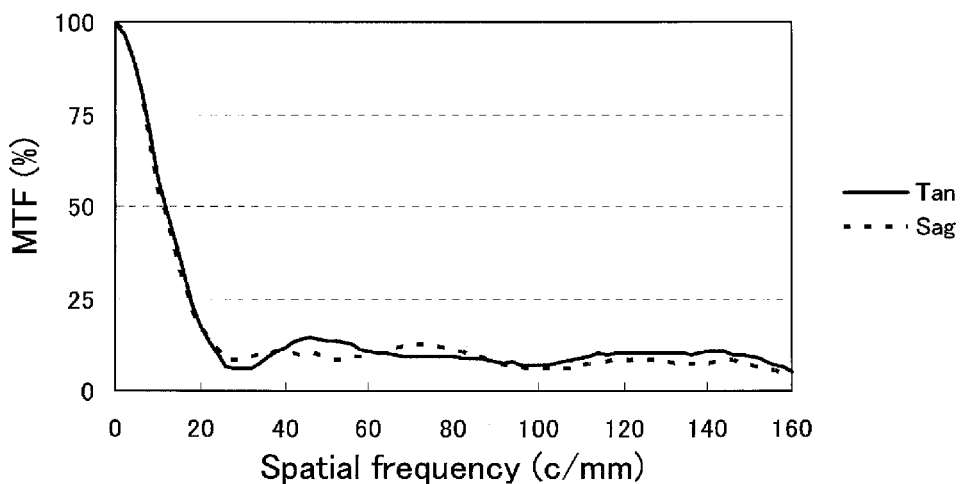
Figures 4, 26:
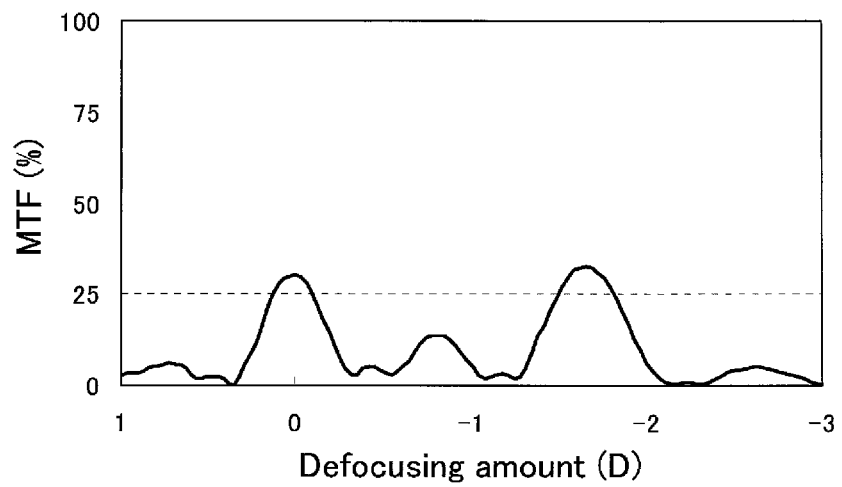
Figure 27:
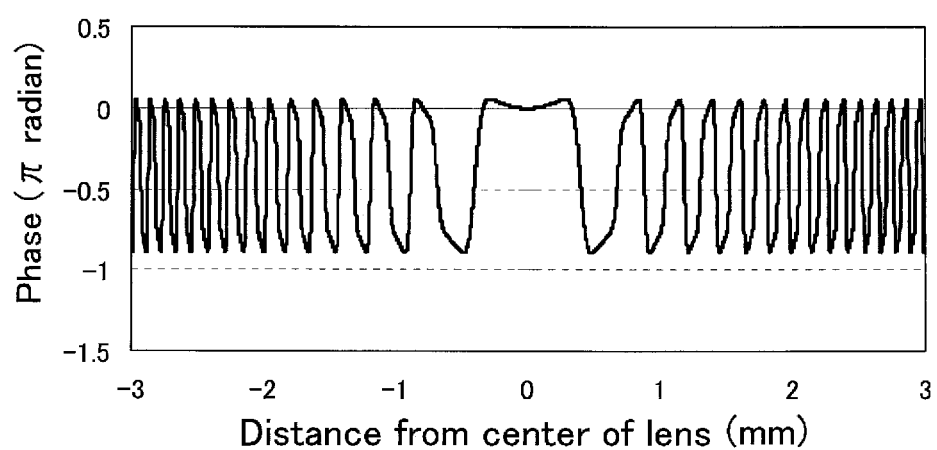
FIG. 27 is a plot showing the diffraction phase structure of the diffraction pattern of the diffractive multifocal lens according to example 4.
Figure 28:
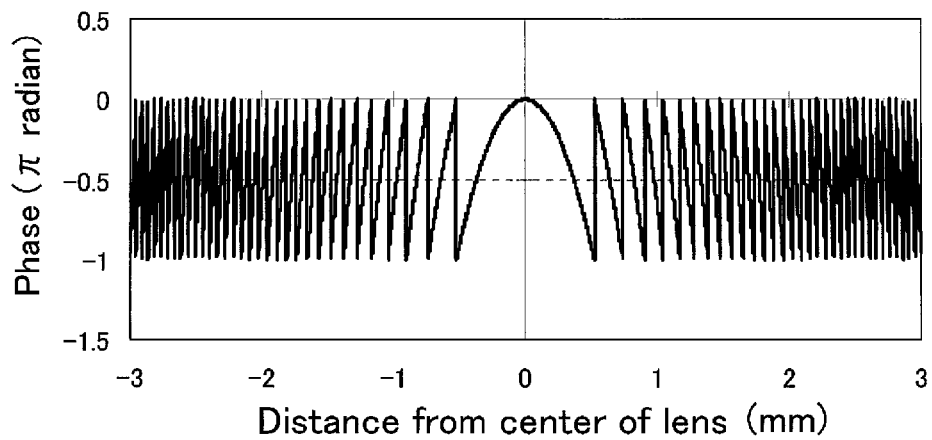
FIG. 28 is a plot showing the diffraction phase structure of the diffraction pattern of the diffractive multifocal lens according to comparative example A.
Figure 29:
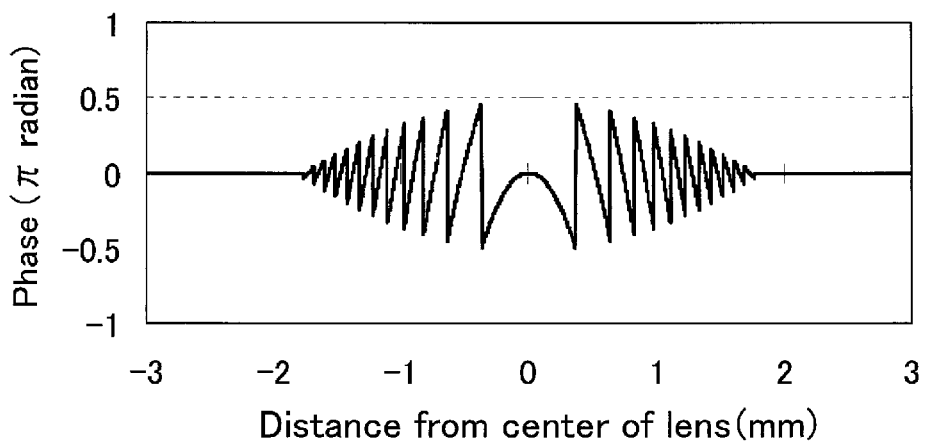
FIG. 29 is a plot showing the diffraction phase structure of the diffraction pattern of the diffractive multifocal lens according to comparative example B.
Figure 30:
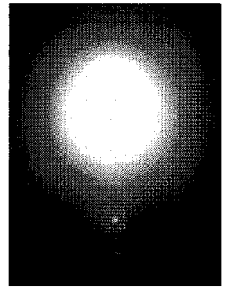
FIG. 30 is a view showing a result of comparing halo and glare obtained by an image simulation through model eye performed to the comparative example A, comparative example B, and example 4.
Figure 30:
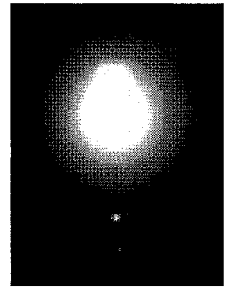
Figure 30:
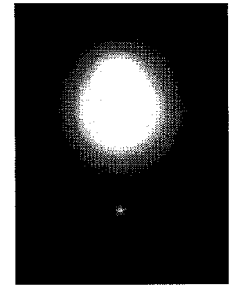
Figure 30:
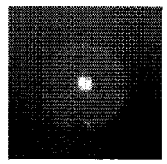
Figure 30:
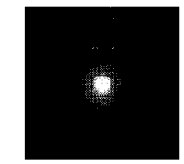
Figure 31:
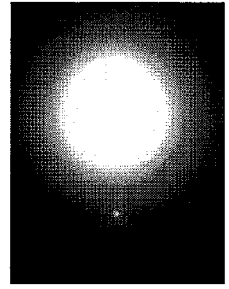
FIG. 31 is a view showing a result of comparing halo and glare obtained by an image simulation through model eye performed to the comparative example A, comparative example B, and example 4.
Figure 31:
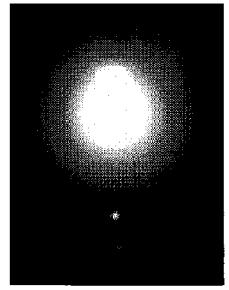
Figure 31:
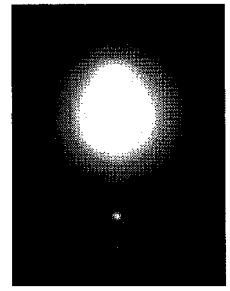
Figure 31:
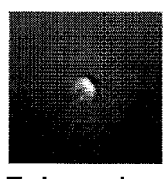

10 Diffractive multifocal lens
11 Object side face
12 Image side face

The invention claimed is:

1. A diffractive multifocal lens, having an annular diffraction pattern for exhibiting a light diffraction effect, which is formed concentrically repeatedly on a surface of a lens,
wherein a diffraction phase structure of the diffraction pattern has a structure expressed by the following formula:

$$\phi(\xi) = \begin{cases} p_1\xi, & 0 \le \xi < w \\ p_2(\xi - 0.5) - q\pi, & w \le \xi < 1-w \\ p_1(\xi - 1), & 1-w \le \xi \le 1 \end{cases} \quad (1)$$

wherein each symbol is as follows:
$\xi$ indicates a position in a radial direction of the lens in one period of the diffraction pattern, having values from 0 to 1;
w indicates a position where a form of the formula of $\phi(\xi)$ is changed;
$\phi(\xi)$ indicates a value (radian) of a phase shift amount of light passing through the position of $\xi$ from the phase of light passing through a reference plane;
$p_1$ indicates a value defining a gradient of a straight line $\phi(\xi)$, when satisfying $0 \le \xi < w$, and $1-w \le \xi \le 1$;
$p_2$ indicates a value defining the gradient of the straight line $\phi(\xi)$ when satisfying $w \le \xi < 1-w$; and
q indicates a parallel moving amount over the reference plane of the straight line $\phi(\xi)$ when satisfying $w \le \xi < 1-w$.

2. The diffractive multifocal lens according to claim 1, wherein the q satisfies $0 < |q| \le 1$.

3. A diffractive multifocal lens, having an annular diffraction pattern for exhibiting a light diffraction effect, which is formed concentrically repeatedly on a surface of a lens,
wherein a diffraction phase structure of the diffraction pattern has a structure expressed by a curve which is obtained by smoothing and optimizing a curve showing a diffraction phase structure of claim 1, using curve approximation, filtering, or convolution integration.

4. The diffractive multifocal lens according to claim 1, wherein the diffractive multifocal lens is an ocular lens such as a contact lens and an intraocular lens.

5. The diffractive multifocal lens according to claim 2, wherein the diffractive multifocal lens is an ocular lens such as a contact lens and an intraocular lens.

6. The diffractive multifocal lens according to claim 3, wherein the diffractive multifocal lens is an ocular lens such as a contact lens and an intraocular lens.

7. A diffractive multifocal lens, having an annular diffraction pattern for exhibiting a light diffraction effect, which is formed concentrically repeatedly on a surface of a lens,
wherein a diffraction phase structure of the diffraction pattern has a structure expressed by a curve which is obtained by smoothing and optimizing a curve showing a diffraction phase structure of claim 2, using curve approximation, filtering, or convolution integration.

8. The diffractive multifocal lens according to claim 7, wherein the diffractive multifocal lens is an ocular lens such as a contact lens and an intraocular lens.

* * * * *